United States Patent [19]

Kamada et al.

[11] Patent Number: 5,790,713
[45] Date of Patent: Aug. 4, 1998

[54] THREE-DIMENSIONAL COMPUTER GRAPHICS IMAGE GENERATOR

[75] Inventors: Hiroshi Kamada, Kawasaki; Ying-Li Hao, Tokyo; Hideki Yanagishita, Kawasaki, all of Japan

[73] Assignee: Fujitsu Limited, Kawasaki, Japan

[21] Appl. No.: 714,502

[22] Filed: Sep. 16, 1996

Related U.S. Application Data

[63] Continuation of Ser. No. 77,688, Jun. 17, 1993, abandoned.

[30] Foreign Application Priority Data

| Jun. 17, 1992 | [JP] | Japan | 4-157819 |
| Nov. 30, 1992 | [JP] | Japan | 4-319634 |
| May 31, 1993 | [JP] | Japan | 5-129516 |

[51] Int. Cl.$^6$ .............................. G06K 9/00
[52] U.S. Cl. ............................ 382/285; 345/355
[58] Field of Search ............... 382/285, 201, 382/203, 293, 295, 154; 395/119, 125, 121, 122; 364/468.04; 345/425, 355

[56] References Cited

U.S. PATENT DOCUMENTS

| 4,982,438 | 1/1991 | Usami et al. | 382/25 |
| 5,287,436 | 2/1994 | Fischer et al. | 395/119 |
| 5,291,561 | 3/1994 | Tanaka et al. | 382/8 |
| 5,341,462 | 8/1994 | Obata | 395/122 |
| 5,579,454 | 11/1996 | Billyard et al. | 395/121 |

OTHER PUBLICATIONS

Kamada et al., "Recognizing Moving Objects from Orthographic Views," *Computer Vision*, vol. 101, No. 9 (75-3), Nov. 22, 1991, pp. 1-8.

Kamada et al., "Interactive 3D Object Recognition System," *23rd Vision Technology Conference*, 1992, 4 pages.

*Primary Examiner*—Yon J. Couso
*Attorney, Agent, or Firm*—Staas & Halsey

[57] ABSTRACT

A three-dimensional computer graphics image generator has an image input unit for inputting an image of a 3-D object into the CG image generator; a display unit for displaying the input image; a characteristic point indication unit for externally specifying characteristic points on the displayed image; and a 3-D object recognition unit for providing 3-D data according to the characteristic-point-added input image. According to the 3-D data, the 3-D CG image generator provides a 3-D CG image that faithfully represents the object.

28 Claims, 34 Drawing Sheets

Fig. 6

| | | NUMBER OF IMAGES | NUMBER OF INDICATION POINTS |
|---|---|---|---|
| 3-D GENERAL | | 3 | 4 |
| RECOGNITION OF AN ANGLE OF DEPRESSION | | 3 | 2 |
| PERSPECTIVE | | 2 | 2 |
| HORIZONTAL OBSERVATION | GENERAL | 3 | 3 |
| | CONSTANT MOVEMENT | 3 | 2 |
| | RIGHT-ANGLE EDGE | 2 | 3 |
| ON A PLANE | | | |

INPUT IMAGE "1"

INPUT IMAGE "2"

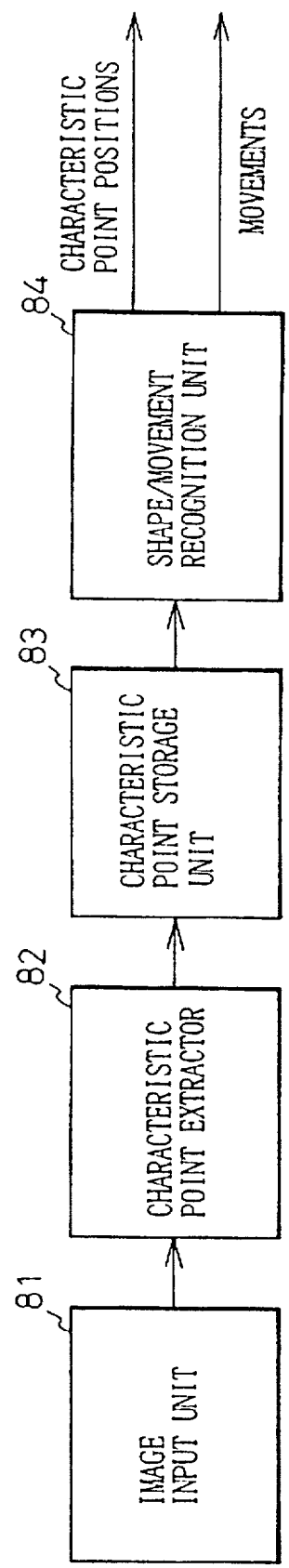

THREE-DIMENSIONAL COMPUTER GRAPHICS IMAGE GENERATOR

This application is a continuation of application Ser. No. 08/077,688, filed Jun. 17, 1993, now abandoned.

BACKGROUND OF THE INVENTION

1. Field of the Invention

The present invention relates to a three-dimensional (hereinafter referred to as 3-D) computer graphics (hereinafter referred to as CG) image generator for generating a CG image of a 3-D object.

2. Description of the Related Art

CG image generators are used to generate a CG image of a 3-D object. CG is employed in various fields such as machinery designing, manufacturing, simulations, entertainment including movies and games, advertisements, and displays. Improvements in functions of semiconductor integrated circuits have popularized small-sized high-function computers and workstations in CG technology and allowed CG to spread even to small-scale users. A market scale of the CG, therefore, is very large.

As CG spreads to small-scale users, a requirement to provide realistic CG images with a small number of processes has arisen.

SUMMARY OF THE INVENTION

An object of the present invention is to provide a 3-D CG image generator that easily generates realistic 3-D CG images.

In order to accomplish the object, a 3-D CG image generator for providing a CG image of a 3-D object according to the present invention has:

- an image input unit for entering two-dimensional (2-D) images of the 3-D object into the CG image generator;
- a display unit for displaying the input images;
- a characteristic point indication unit for externally specifying characteristic parts on the displayed image; and
- a 3-D object recognition unit for providing 3-D data according to the characteristic parts added to the input images. These 3-D data are used to prepare a CG image of the object.

The indication unit is preferably a pointing device.

The characteristic parts are preferably superimposed on the input images and displayed on the display unit.

The object is preferably photographed at different angles to provide a plurality of input images, which are displayed on the display unit. On each of the input images, mutually corresponding characteristic parts are specified through the indication unit.

The characteristic parts are input as characteristic points and lines that define the 3-D object.

The characteristic points of the 3-D object may be end points defining the 3-D object, and the characteristic lines are edges linking the end points and defining the 3-D object.

When a button of a pointing device serving as the indication unit is pushed down, a point on a coordinate system pointed at this moment by the pointing device is determined as a characteristic point of the object, and when the button is released after some dragging, a point on the coordinate system pointed at this moment by the pointing device is determined as another characteristic point of the object. A segment that links the two characteristic points is determined as a characteristic line of the object.

Each segment linking the pushed point and dragging point is continuously displayed on the display unit as the pointing device is dragged until the button is released, to form an edge of the object.

A point where the button of the pointing device is pushed down or released is determined as a start or end point of a characteristic line, only if a distance between the point and a registered characteristic point is greater than a predetermined value.

A registered characteristic point is determined as a start or end point of a characteristic line, only if a distance between the registered characteristic point and a point where the button of the pointing device is pushed down or released is smaller than a predetermined value.

A characteristic line and the start and end points are not registered, if a distance between the start and end points is smaller than a predetermined value.

A characteristic line and the start and end points are registered, if a distance between the start and end points is greater than the predetermined value.

Another 3-D CG image generator according to the present invention has:

- an image input unit for inputting 2-D images of the object into the CG image generator;
- a wire-frame modeler for preparing a 2-D wire-frame model with end points and edges specified on the input image;
- a polygon divider for dividing the wire-frame model into polygons;
- a polygon recognition unit for computing the 3-D coordinates of each of the polygons; and
- a combiner for combining the three-dimensionally computed polygons together, to provide 3-D data of a polyhedron that represents the object.

The wire-frame modeler may have a wire-frame indication unit for forming the 2-D wire-frame model over the input image, and a combiner for combining the input image and the 2-D wire-frame model together.

The wire-frame modeler may have an edge extractor for extracting edges from the input image, and an end point extractor for extracting end points from the input image.

The recognition unit recognizes each of the polygons as a flat surface, to prepare a CG image of the polyhedron.

When preparing a CG image of the polyhedron, a distance between a specific end point on the polyhedron and a view point is specified, and according to the specified distance and the recognized polygons, the 3-D coordinates of other end points are determined.

Still another 3-D CG image generator according to the present invention has:

- an image input unit for inputting 2-D images of the object into the CG image generator;
- a display unit for displaying the input images;
- a wire-frame modeler for preparing a 2-D wire-frame model with characteristic parts of the object obtained on the input image;
- a 3-D object recognition unit for providing 3-D data according to the wire-frame model, the 3-D data being used to prepare a CG image of the object; and
- a CG image generation unit for preparing a CG image of the object according to the 3-D data and transmitting the CG image to the display unit.

The wire-frame modeler has:

- an external unit for entering or correcting the characteristic parts in response to externally provided instructions; and
- an internal unit for generating or correcting the characteristic parts according to decisions made by the CG image generator itself.

The external unit may correct the characteristic parts provided by the internal unit and provide the wire-frame model.

The internal unit may correct the characteristic parts provided by the external unit and provide the wire-frame model.

The external unit may correct the characteristic parts provided by the external unit and provide the wire-frame model.

The external unit may enter the characteristic parts while referring to the characteristic parts that have been extracted by the internal unit, superimposed on the input image, and displayed on the display unit.

The characteristic parts may be characteristic points and lines that define the object.

When the external unit provides a first characteristic part, the internal unit may extract a second characteristic part around the first characteristic part and correct the first characteristic part according to the second characteristic part.

The second characteristic part may be a point characterized by density distribution around the first characteristic part.

The display magnification of the display unit may be expanded when the external unit enters the characteristic parts.

The recognition unit three-dimensionally recognizes characteristic parts common to the input images of the object that have been photographed in different directions, to provide 3-D data for each of the input images, and combines the 3-D data of the input images together, to provide 3-D data for the whole of the object.

The CG image generation unit may have a texture adding function for adding a texture to each surface of the image of the object provided by the recognition unit by selecting the texture data of a corresponding surface of the input image whose photographed angle is closest to the display angle of the image of the object on the display unit.

The CG image generation unit may have a texture adding function for adding a texture to each surface of the image of the object provided by the recognition unit by selecting a texture of a corresponding surface of the input image that shows the surface in question most clearly.

The CG image generation unit may have a texture adding function for adding a texture to each surface of the object provided by the recognition unit by interpolating the texture data of corresponding surfaces of the input images that have been photographed in different directions around the display angle of the surface in question.

BRIEF DESCRIPTION OF THE DRAWINGS

FIG. 6 shows relationships between the numbers of image planes and the numbers of specified points needed to extract 3-D information;

FIG. 34 shows the principle of a 3-D object recognition method related to the present invention.

DESCRIPTION OF THE PREFERRED EMBODIMENTS

Before describing the preferred embodiments of the present invention, a prior art and its problem will be explained in detail.

A 3-D CG image generator according to the prior art asks a user to enter all data for the shape of a 3-D object. When the object has a cubic shape, for example, the user must enter the 3-D coordinates of eight end points of the object.

Figure 1:
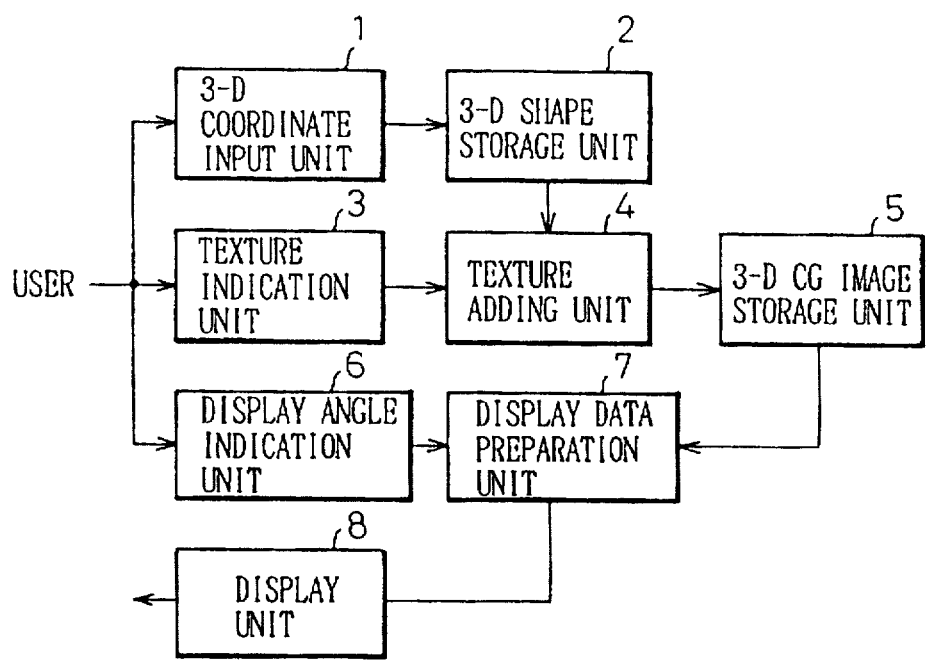
FIG. 1 shows an example of a 3-D CG image generator according to a prior art.

FIG. 1 shows the conventional 3-D CG image generator. This generator has a 3-D coordinate input unit 1, a 3-D shape storage unit 2, a texture indication unit 3, a texture adding unit 4, a 3-D CG image storage unit 5, a display angle indication unit 6, a display data preparation unit 7, and a display unit 8.

A user uses the input unit 1 to enter the coordinates of end points of a 3-D object as well as data specifying edges linking the end points. The input unit 1 may carry out 3-D operations such as expansion and reduction operations on a basic figure according to user's instructions. The shape data of the object entered through the input unit 1 is stored in the storage unit 2.

The user uses the texture indication unit 3 to enter the kind of a texture (pattern) for each surface of the object. The specified textures are transferred to the texture adding unit 4. The unit 4 adds the textures to the corresponding surfaces of the image stored in the storage unit 2. The texture added image is stored in the storage unit 5.

The user uses the display angle indication unit 6 to enter a view angle for displaying a 3-D CG image of the object on the display unit 8. According to the view angle, the display data preparation unit 7 processes the data stored in the storage unit 5, to prepare two-dimensional display data. According to this data, the display unit 8 displays a 3-D CG image of the object.

When the object is a complicated item such as a tape recorder involving various components like a casing, buttons, and a tape insertion window, it requires many processes to combine image data of these components together and provide a realistic 3-D CG image of the tape recorder.

Accordingly, an object of the present invention is to provide a 3-D CG image generator that allows a user to easily prepare a realistic 3-D CG image of an object.

To achieve the object, the present invention photographs an actual 3-D object with a camera and extract 3-D data from the photographed object, to easily provide a 3-D CG image of the object.

Namely, the present invention obtains two-dimensional images of an actual 3-D object, extracts 3-D data out of the two-dimensional images, and according to the extracted 3-D data, easily provides a 3-D CG image of the object.

The basics of the present invention will be explained with reference to FIGS. 2A to 2D.

Figure 2A:
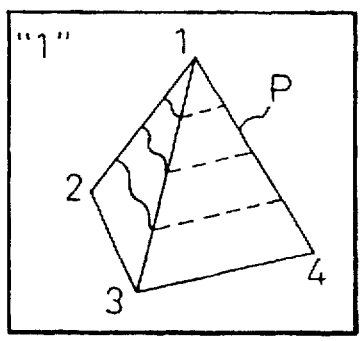
FIGS. 2A to 2D explain the principle of the present invention.
Figure 2B:
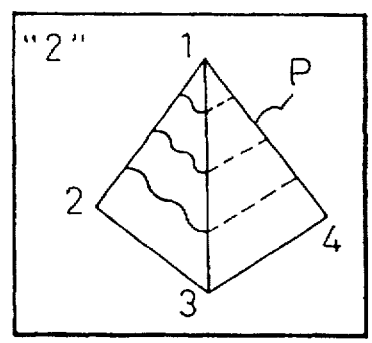
Figure 2C:
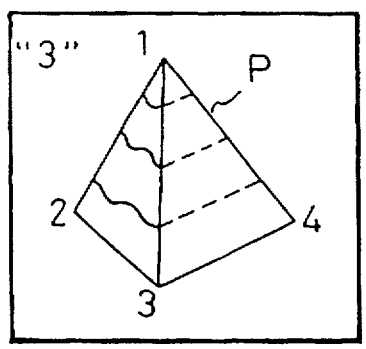

The present invention photographs a 3-D object P at different angles with a camera and provides, for example, three images shown in FIGS. 2A to 2C. A pointing device such as a mouse is employed to enter characteristic parts such as end points 1, 2, 3, and 4 on the images. The mouse is also used to enter edges that link the points 1 and 2, 1 and 3, 1 and 4, 2 and 3, and 3 and 4, respectively. These characteristic parts, i.e., the end points and edges are superimposed on the input images and displayed. In this way, the three images and four characteristic points are obtained and recognized to provide 3-D data.

Figure 2D:
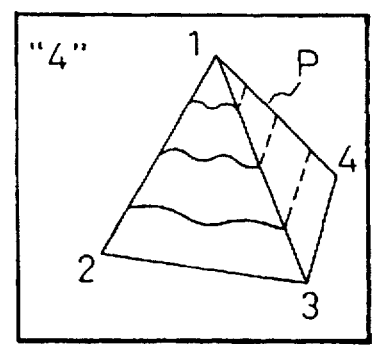

A display angle (a display rotation angle) of the object P may be specified, and then a 3-D CG image of the object P is displayed as shown in FIG. 2D.

Figure 3:
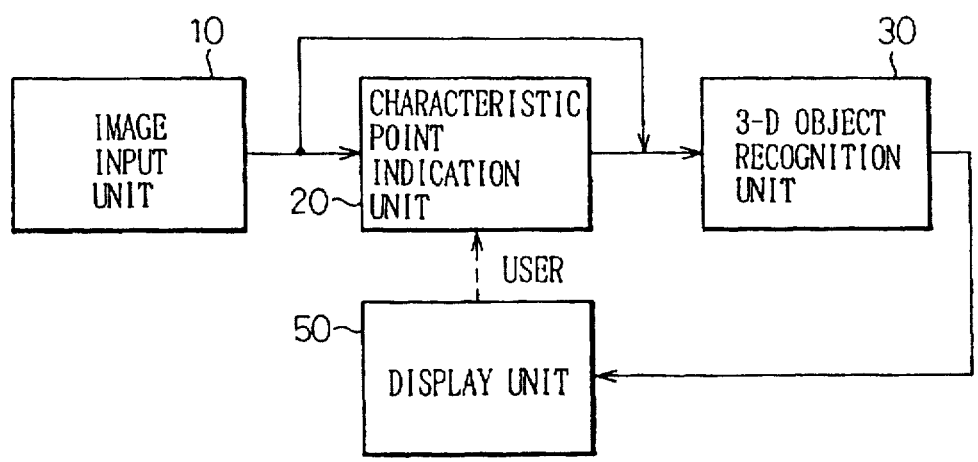
FIG. 3 shows a basic arrangement of a 3-D CG image generator according to the present invention.

FIG. 3 shows a basic arrangement of the 3-D CG image generator according to the present invention.

The generator includes an image input unit 10 for inputting the images of a 3-D object P into the image generator, a display unit 50 for displaying the input images, a characteristic point indication unit 20 for specifying characteristic parts on the displayed images, and a 3-D object recognition unit 30 for providing 3-D data to be used for preparing a CG image of the object P.

The characteristic parts entered through the indication unit 20 are added to the input images displayed on the display unit 50, and the recognition unit 30 provides 3-D data according to the characteristic part added to input images.

In this way, a user specifies characteristic parts such as characteristic points and lines on the two-dimensional images of a 3-D object displayed on the display unit. According to the entered data, the 3-D CG image generator of the present invention recognizes the shapes and movements of the object and provides a 3-D CG image of the object. Unlike the prior art that asks a user to sequentially enter all necessary 3-D data of a 3-D object, the present invention easily forms a 3-D image of an object.

A. First Embodiment of the Invention

Figure 4:
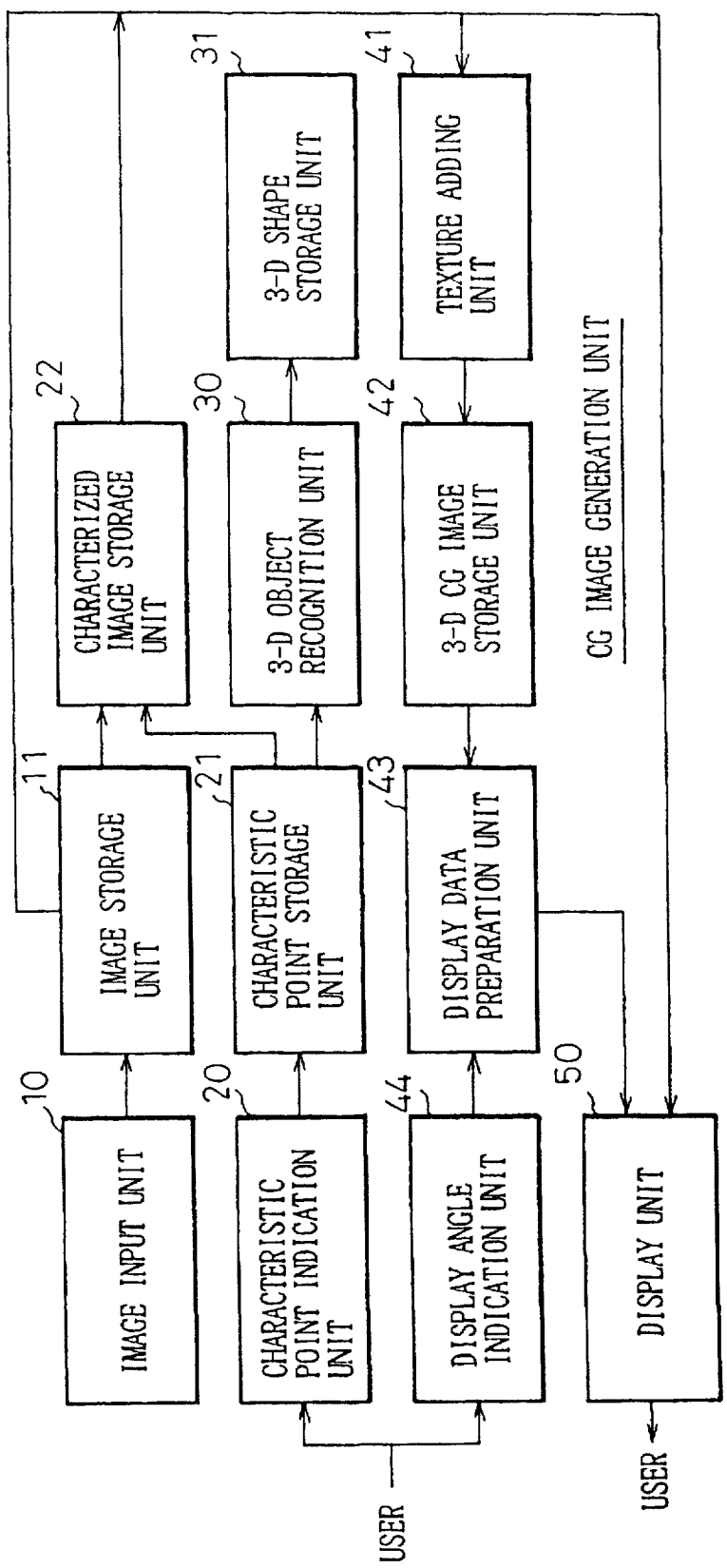
FIG. 4 shows a 3-D CG image generator according to a first embodiment of the present invention.

The first embodiment of the present invention will be explained with reference to FIGS. 4, 5A to 5C, and 6, in which FIG. 4 shows an arrangement of the embodiment, FIGS. 5A to 5C explain the operations of the embodiment, and FIG. 6 shows relationships between the numbers of image planes and the numbers of specified points necessary for extracting 3-D data.

In FIG. 4, an image input unit 10 is used to enter images of an actual object into the 3-D CG image generator. The input images are stored in an image storage unit 11.

To prepare a CG image of the object, the present invention may employ a method of using a single input image. This method uses disappeared points and lines of the image. Alternatively, the present invention may employ a method of using a plurality of input images. This method may employ a plurality of television cameras to simultaneously photograph an object, or a single television camera to photograph an object in different directions. In each case, characteristic points are specified on the photographed images, and the images are related to one another to provide 3-D data of the object.

The method of employing a plurality of television cameras involves a stereoscopic technique based on the principle of triangulation. The method of employing a single television camera is disclosed in, for example, JPA 3-236465 (JPP 5-73680), 3-236464 (JPP 5-73684), 3-236466, 3-236467, 3-300591, 4-47239, 4-47238, and 4-48449 of the present applicant.

FIG. 6 shows relationships between the numbers of image planes and the numbers of specified characteristic points required by the above methods. To prepare standard 3-D data, the number of image planes required will be three, and the number of specified characteristic points required will be four. The details of the relationships shown in FIG. 6 will be explained later.

The present invention needs, as characteristic parts of a 3-D object, end points of the object as well as edges that link the end points. Accordingly, a user enters these characteristic parts on images displayed on a display unit, to prepare wire-frame models. According to the wire-frame models, an image recognition method employed by the present invention computes 3-D positions of the end points and provides the shape information of the object.

Instead, it is possible to form two-dimensional wire-frame models of the object and divide each model into polygons. A texture of each of the polygons is added to a corresponding polygonal surface of a 3-D image of the object.

An example of a 3-D CG image generator according to the present invention will be explained. This example employs the object recognition method disclosed in the JPA 3-300591. This method needs three images and four characteristic points to recognize a 3-D object, as shown in FIG. 6. The recognition method includes the following four steps:

(1) Displaying

Three images "1" to "3" of FIGS. 2A to 2C photographed by a camera are provided to the 3-D CG image generator. The CG image generator displays the images in respective screen windows of a display unit.

(2) Characteristic point indication

A user employs, for example, a mouse to specify characteristic points on each of the images. According to the specified points, the CG image generator displays marks or numbers such as 1 to 4 at the specified points on the respective images, as shown in FIGS. 2A to 2C. The user also specifies edges that link the characteristic points.

Each position where the mouse is pushed down or released is determined as a characteristic point. A segment that links such characteristic points is determined as an edge. These characteristic points and edges are displayed on the display unit.

(3) 3-D Object Recognition

The CG image generator recognizes the shape and view angle of the object according to the characteristic points and edges.

(4) Displaying Recognized Result

The CG image generator adds textures picked up from the input images to the 3-D shape, and displays the shape of the 3-D object according to an angle specified by the user.

A segment that links two characteristic points is specifiable by pushing down and releasing the mouse button. The mouse button is pushed at the start of a segment and is released at an end of the segment. A track of the mouse between start and end points is continuously displayed, to define a segment. According to this technique, a segment properly runs along an edge of the object. This technique is used with the following four rules:

(1) If a distance between a point where the mouse button is pushed (released) and a registered characteristic point is greater than a predetermined value, the point in question is defined as a start (end) point of a segment.

(2) If a distance between a point where the mouse button is released (pushed) and a registered characteristic point is smaller than a predetermined value, the registered point is defined as a start (end) point.

(3) If a distance between an end point and a start point is smaller than a predetermined value, corresponding characteristic points and a segment are not registered.

(4) If the distance between the end and start points is greater than the predetermined value, the start and end points and a segment that link these points are registered as characteristic parts.

This technique rejects extremely short segments, to avoid errors. If a newly specified point is very close to an existing characteristic point, the new point is deemed to be identical with the existing point. This technique of determining characteristic points and segments absorbs fluctuations caused by manually pointing the characteristic points and provides correct characteristic points and segments.

The first embodiment of FIG. 4 will be explained in detail.

The image input unit 10 is, for example, a television camera to photograph a 3-D object. In this embodiment, the television camera photographs the object in three different directions, to provide three input images. The input images are stored in an image storage unit 11. These images are displayed on a display unit 50.

This embodiment employs the object recognition method disclosed in the JPA 3-300591, so that one of characteristic points to be specified may be positioned at an original point of a coordinate system.

Figure 5A:
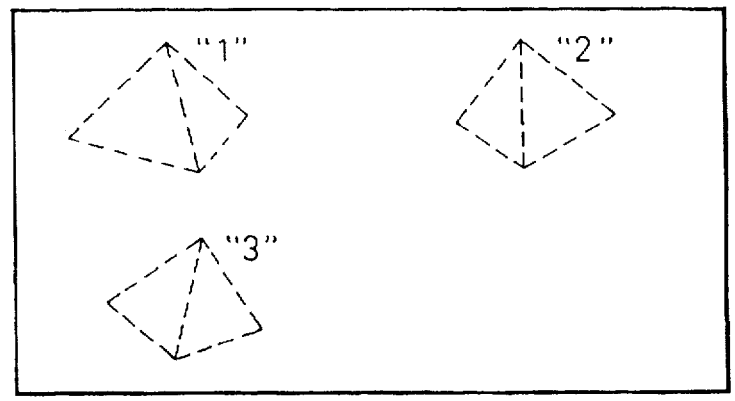
FIGS. 5A to 5C explain the operations of the first embodiment.
Figure 5B:
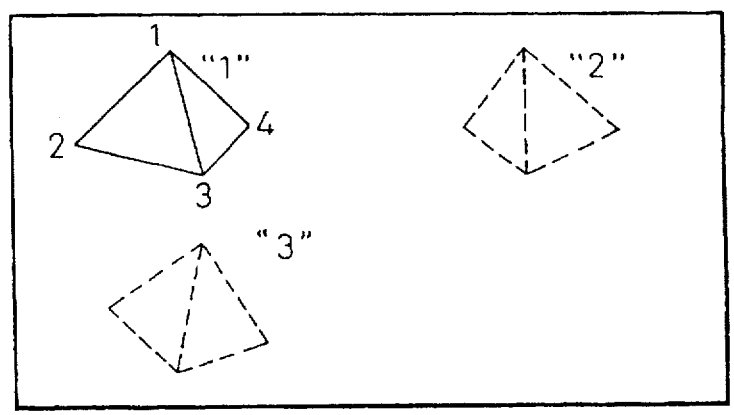
Figure 5C:
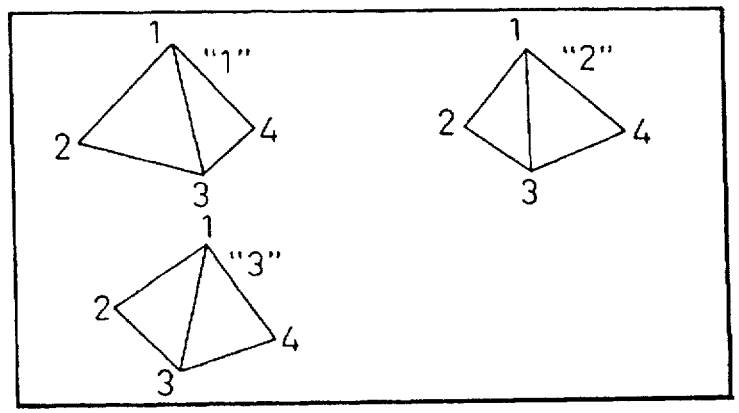

The display unit 50 may be of a workstation that employs an X window system to simultaneously display the three input images of the object, as indicated with "1," "2," and "3" in FIGS. 5A to 5C.

A user specifies characteristic points on the displayed images with use of a characteristic point indication unit 20, which may be a mouse. In FIG. 5B, characteristic points 1 to 4 are entered for the image "1." These characteristic points may be numbered in the order of pointing. When a mouse button is pushed down at the point 1 and is released at the point 2, an edge that links the two points is entered. In this way, characteristic points and edges for the image "1" are specified.

Similarly, characteristic parts are specified on each of the images "1" to "3" as shown in FIG. 5C. The characteristic parts are stored in a characteristic point storage unit 21. These characteristic data are added to the images, and they are stored in a characterized image storage unit 22.

The characteristic part data for the three images shown in FIG. 5C are supplied to a 3-D object recognition unit 30. The recognition unit 30 computes and recognizes the 3-D object. The unit 30 provides a 3-D wire-frame model made of the characteristic points and edges to a 3-D shape storage unit 31.

A texture adding unit 41 adds textures to the 3-D wire-frame model, and the texture added data are stored in a 3-D CG image storage unit 42.

If a user wants to change a display angle, the user enters a required display angle through a display angle indication unit 44. A display data preparation unit 43 fetches the 3-D wire-frame model from the storage unit 42, processes the data according to the entered display angle, to prepare two-dimensional (2-D) display data, and displays the data on the display unit 50. With use of the X window system, a 3-D CG image of the object may be displayed in a lower right area of a screen of the display unit 50 according to the required angle. Instead, the 3-D CG image may be displayed in full screen on the display unit 50.

In the above explanation, the characteristic point indication unit 20 is the mouse and the 3-D object is the triangular pyramid. These matters do not limit the present invention. For example, the indication unit 20 may be a touch-pen, and the object may have a complicated shape.

The above embodiment employs the object recognition method disclosed in the JPA 3-300591. This does not limit the present invention. The present invention may employ any object recognition method. For example, the method of using a single input image is employable. This method uses disappeared points and lines on an image of an object. The method of employing a plurality of input images is also employable. This method may employ a plurality of television cameras for simultaneously photographing an object, or a single television camera for photographing an object in different directions. In any case, characteristic points of an object are specified on input images, and these points are related with one another on the images, to provide 3-D data. The method of employing a plurality of television cameras may employ a stereoscopic technique based on the principle of triangulation. The method of employing a single television camera may employ any technique mentioned above.

Figure 7:
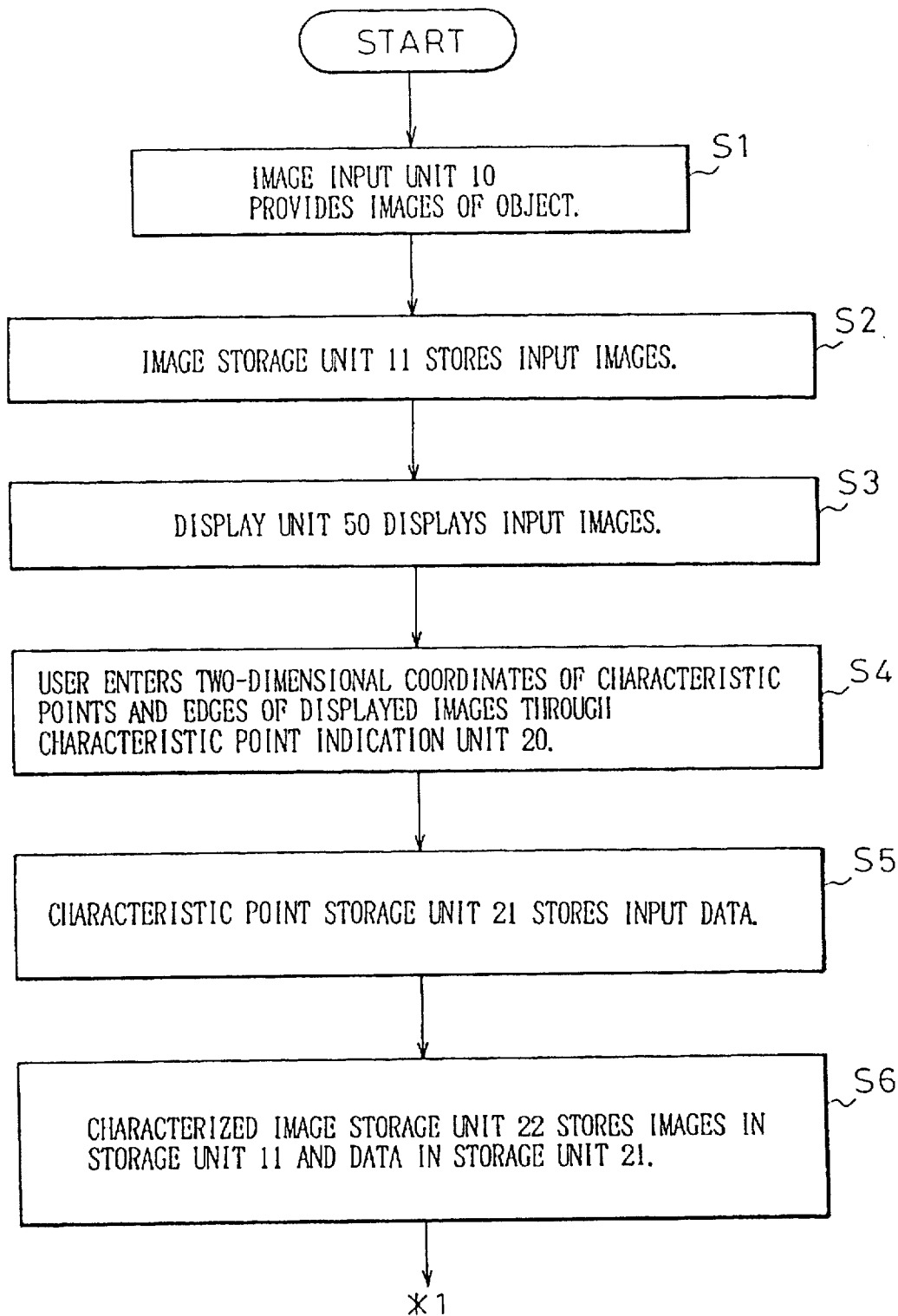
FIGS. 7 and 8 are flowcharts showing the operations of the first embodiment.
Figure 8:
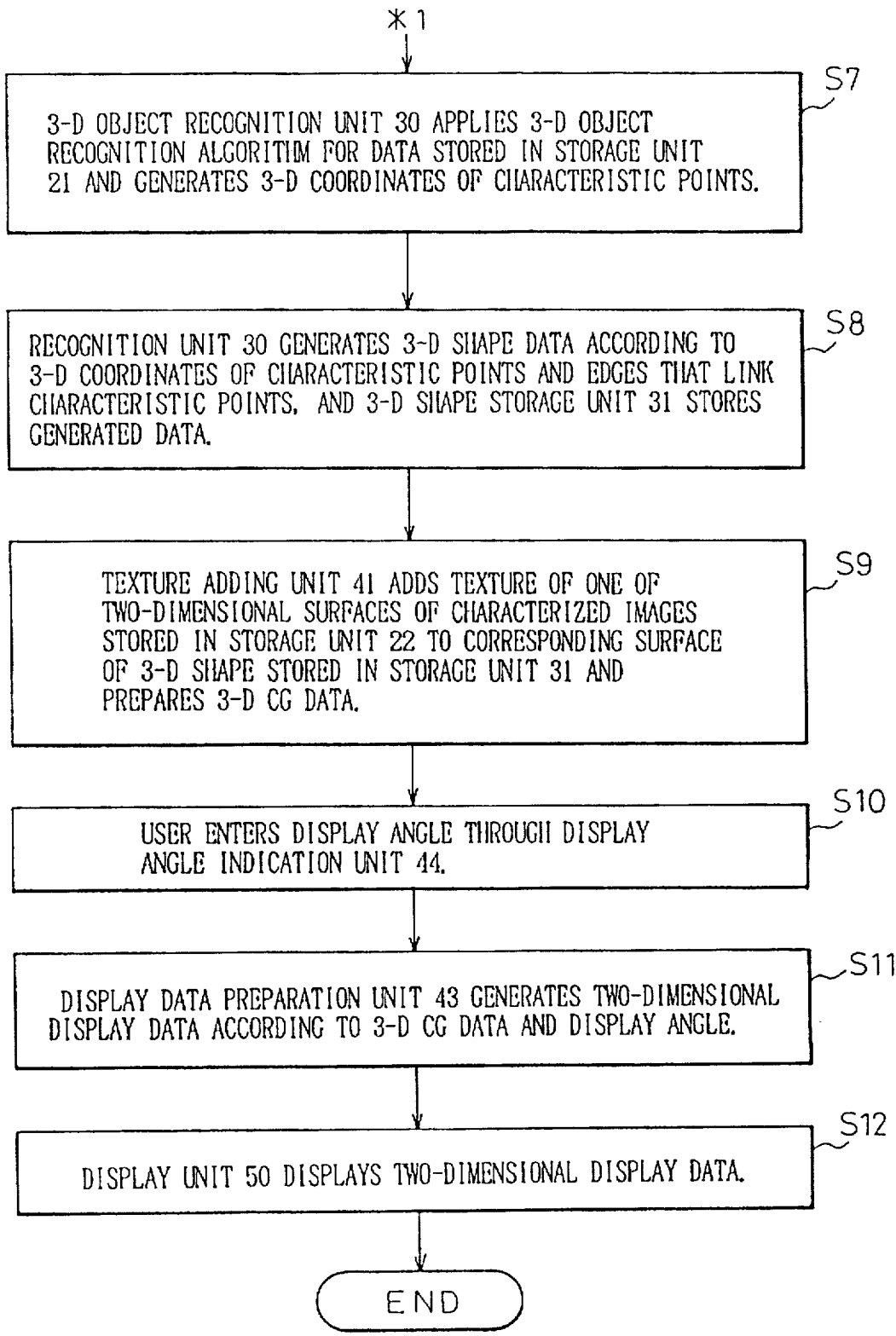

FIGS. 7 and 8 are flowcharts summarizing the operations of the first embodiment. Since the operations mentioned in steps S1 to S12 of the flowcharts have already been explained with reference to FIGS. 4 to 6, they will not be explained again.

Figure 9:
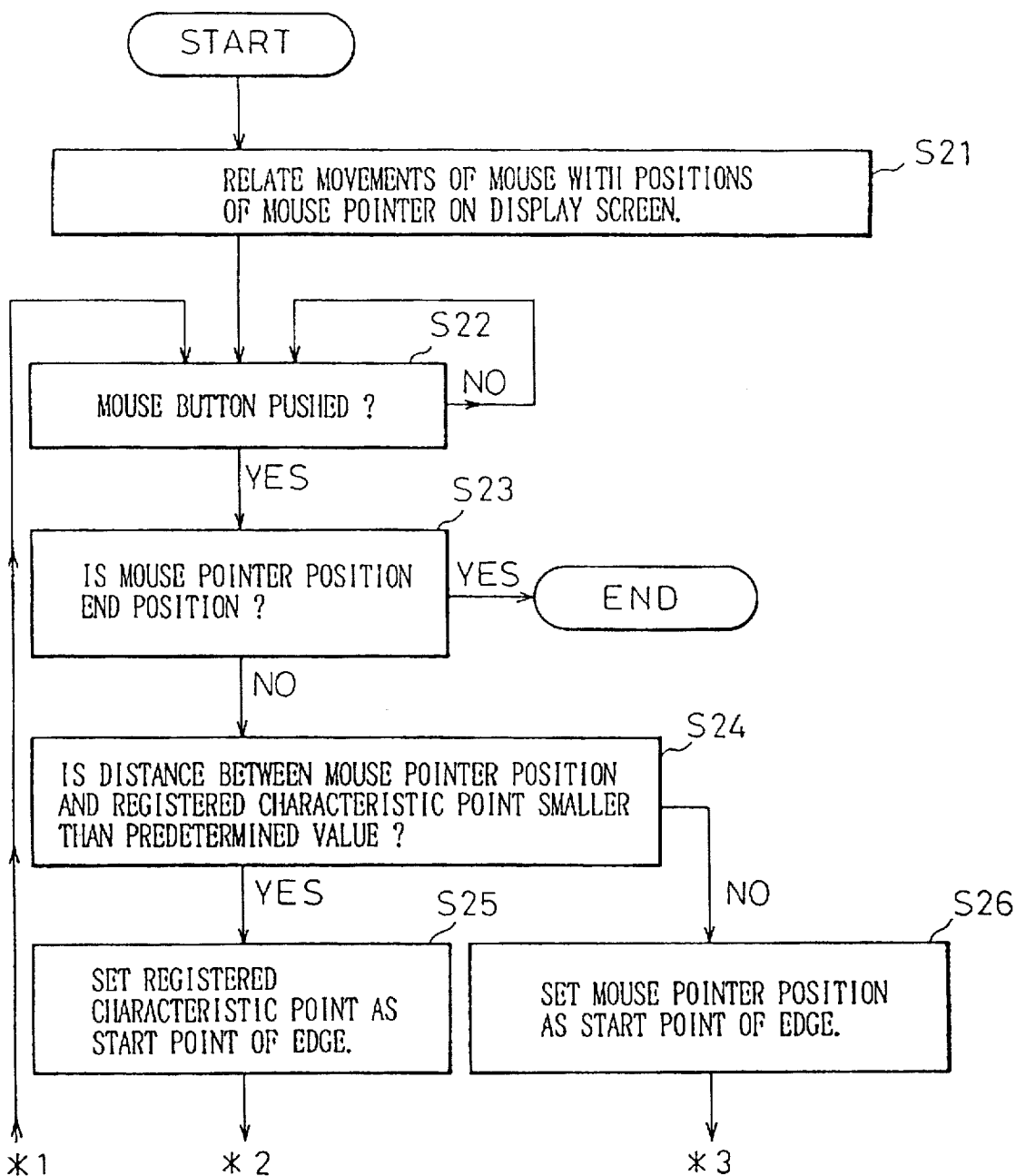
FIGS. 9 to 11 are flowcharts showing the operations of a characteristic point indication unit according to the present invention.
Figure 10:
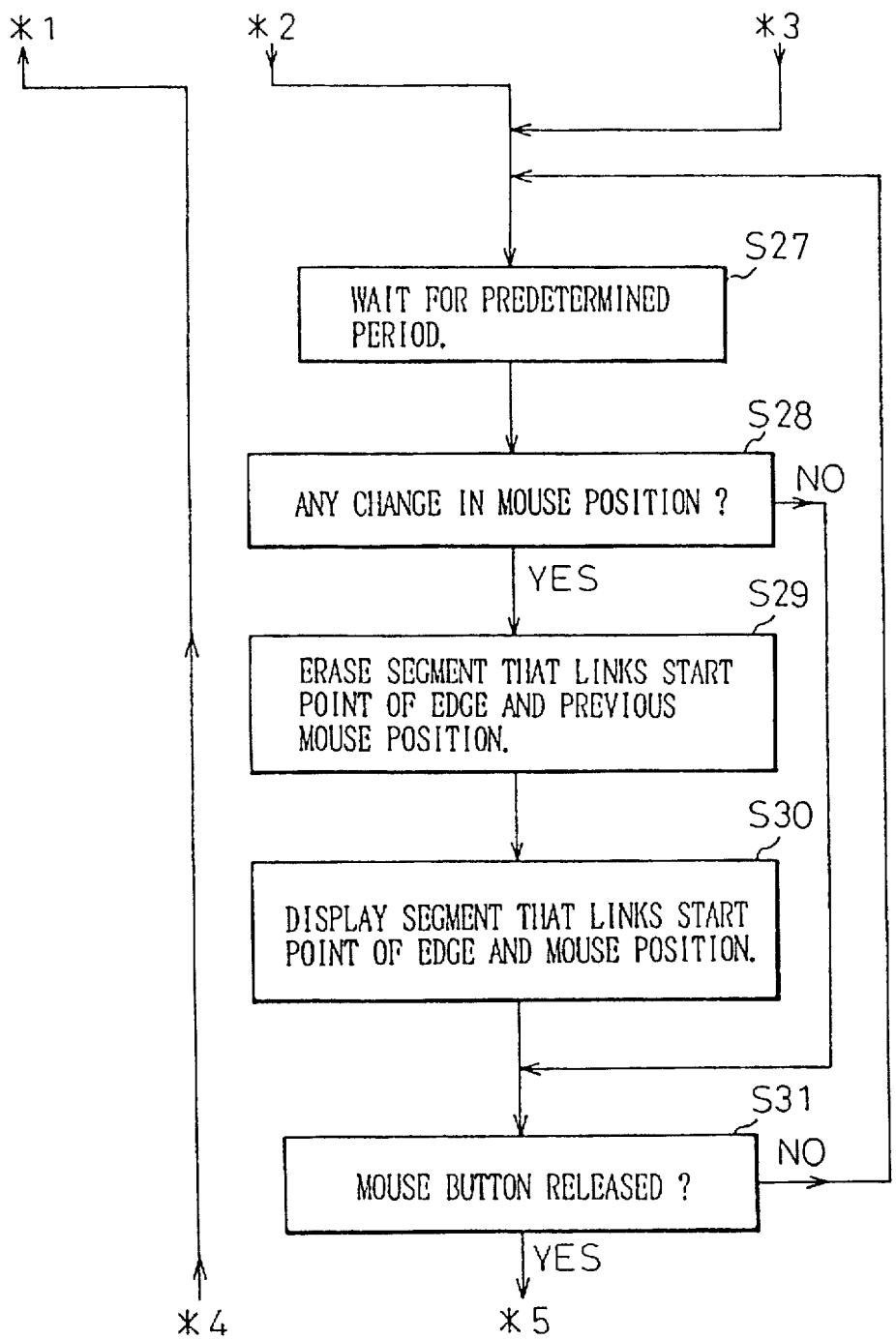
Figure 11:
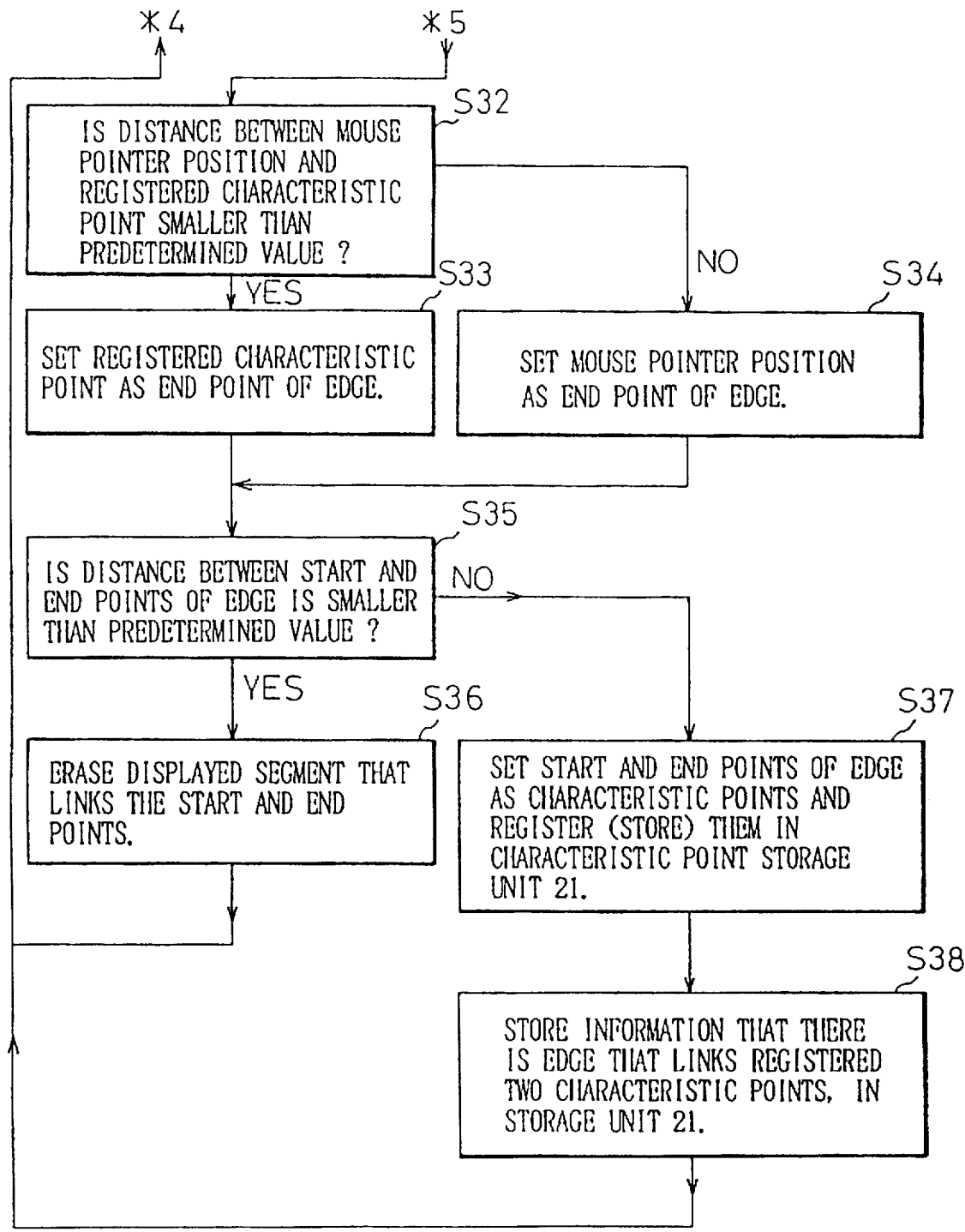

FIGS. 9 to 11 are flowcharts summarizing the operations of the indication unit (mouse) 20 of the first embodiment. Since the operations mentioned in steps S21 to S38 of the flowcharts have already been explained with reference to FIGS. 4 to 6, they will not be explained again.

B. Second Embodiment of the Invention

Figure 12A:
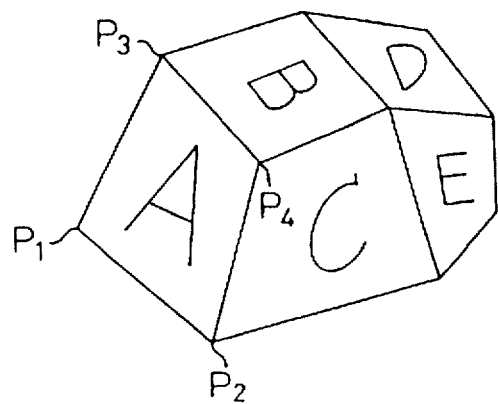
FIGS. 12A and 12B show an example of an input image and an example of a three-dimensionally recognized image of the input image.
Figure 12B:
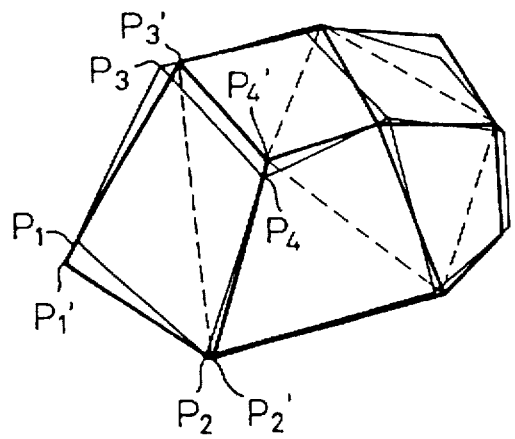

FIG. 12A shows a polyhedron. In FIG. 12B, a polyhedron drawn with thin lines is correctly identical to the polyhedron of FIG. 12A, while a polyhedron drawn with thick lines is an incorrect one recognized with the CG image generator of FIG. 4. The incorrectness is due to recognition errors caused in the CG image generator.

Generally, a 3-D object recognition unit three-dimensionally recognizes an original 3-D object from two dimensional images of the object photographed by a television camera. The recognition unit is important for visual systems and robot view systems in factory automation and monitoring. The recognition unit is also important for providing a data processing device with 3-D data according to real images.

In the field of factory automation, there are many artificial objects to be handled, and these objects are usually polyhedrons each being defined with end points and edges and involving polygonal flat surfaces. It is, therefore, very important to recognize polyhedrons in factory automation.

The resolution of a television camera has some limit, and therefore, an image provided by the camera always involves quantization errors. Namely, the three dimensional coordinates of each recognized end point has errors. When the 3-D coordinates of end points that define a polygonal surface of a polyhedron have errors, the polygonal surface, which is originally flat, will not be viewed as flat. Accordingly, one may feel an incongruousness when seeing the image.

If the polyhedron object shown in FIG. 12A is correctly recognized, end points P1 to P4 of a surface A of the object will be recognized as end points P1 to P4 shown in FIG. 12B. If there are quantization errors, they may be recognized as P1' to P4' to distort the surface A as indicated with the thick lines in FIG. 12B.

Due to the quantization errors, the end points P1' to P4' are not on the same plane. A group of three end points is on a first plane, and another group of three end points is on a second plane. Namely, the surface A in FIG. 12B is divided into a first plane defined by the end points P1', P2', and P3' and a second plane defined by the end points P2', P3', and P4'. In this way, the surface A is bent and distorted along a segment linking the end points P2' and P3'. It is also true that the surface A is bent and distorted along a segment linking the end points P1' and P4', to define a first plane with the end points P1', P2', and P4' and a second plane with the end points P1', P3', and P4'.

If such distortion exists, it will be impossible to allocate a texture of a surface of an input image to a corresponding surface of a 3-D CG image because no correlation is established between the surfaces of the input image and 3-D CG image.

Figure 13:
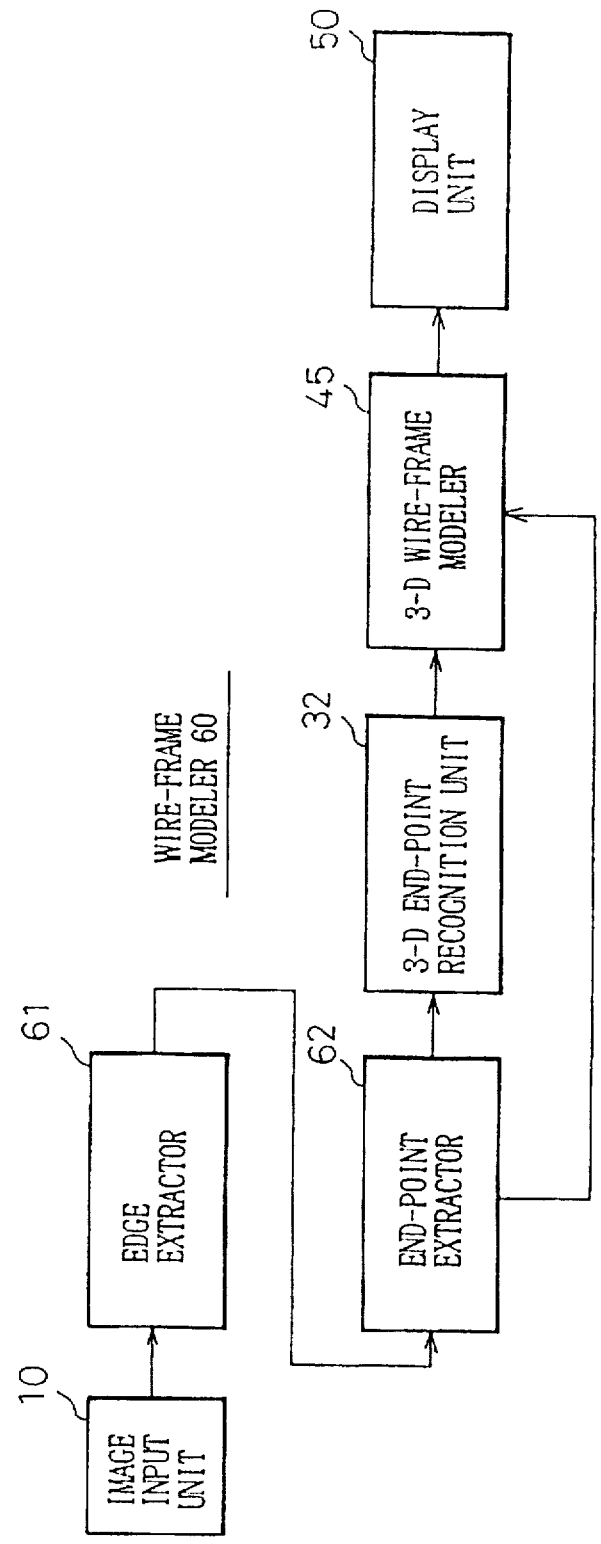
FIG. 13 shows an example of a 3-D object recognition unit according to a prior art.

The problem of distortion in a recognized image occurs not only in the CG image generator of FIG. 4 but also in a conventional 3-D object recognition unit of FIG. 13.

The conventional recognition unit of FIG. 13 includes an image input unit 10, an edge extractor 61, an end point extractor 62, a 3-D end point recognition unit 32, a 3-D wire-frame modeler 45, and a display unit 50.

The image input unit 10 such as a television camera photographs a polyhedron object in two different directions to provide two input images. When the object is moving, it may be photographed at different time points T1 and T2. It is possible to move the input unit 10 instead. It is also possible to employ two image input units 10 located at different positions.

The edge extractor 61 carries out a spatial filtering process such as a differential masking process on the input images and provides edge images. The end point extractor 62 extracts end points such as edge bending and branching points out of the edge images. The extractors 61 and 62 form a wire-frame modeler 60.

The recognition unit 32 computes the depth coordinates, i.e., 3-D coordinates of end points according to two-dimensional (2-D) coordinates of the end points. This computation is carried out according to a known method. For example, the 3-D coordinates of end points are calculated from coordinates of eight or more end points in two images of an object photographed in different directions.

According to the 3-D coordinates of the end points and the edge data used for extracting the end points, the wire-frame modeler 45 provides a 3-D wire-frame model by connecting the end points with segments. The wire-frame model is displayed on the display unit 50. The wire-frame model may be viewed at a different angle on the display unit 50.

As explained before, a television camera has limits in its resolution, and can cause quantization errors in wire-frame models. Namely, the 3-D coordinates of the end points may involve errors to cause the above-mentioned problem.

An object of the second embodiment of the present invention, therefore, is to solve the problem of giving a user an incongruous feeling due to the distorted surfaces of a polyhedron image.

The second embodiment will be explained with reference to FIGS. 14 and 15.

Figure 15:
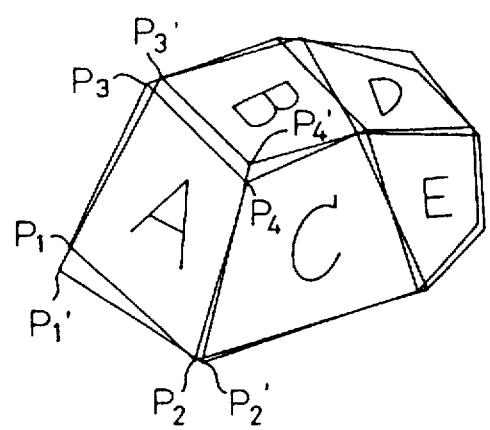
FIG. 15 explains the operations of the second embodiment.

FIG. 15 explains the operations of the second embodiment. In the figure, a surface A of a polyhedron object is defined by end points P1 to P4. The object is photographed with a television camera, and the surface A is recognized with end points P1' to P4'. An inclination of the surface A is also recognized. A surface B is recognized as passing the end point P4'.

To determine the end point P3', an intersection line defined by the surfaces A and B and passing the end point P4' is obtained. A point P3a of the surface A corresponds to the end point P3, and a point P3b of the surface B corresponds to the end point P3. The points P3a and P3b are averaged to provide an average point P3ab. A perpendicular is drawn from the average point P3ab to the intersection line defined by the surfaces A and B, to provide an intersection that forms the end point P3'. Similarly, the end point P2' is obtained from an intersection line defined by the surfaces A and C.

In this way, end points of each surface are found. The end point P1' may be set on the end point P1.

As explained above, the present invention recognizes each flat surface of a polyhedron at first and then finds end points and edges of each surface of the polyhedron. Accordingly, the present invention provides a 3-D CG image of the polyhedron with no distortion. Since there is no distortion, a texture of one surface of an input image is allocated to a corresponding surface of the CG image. Accordingly, the CG image will never give a user an incongruous feeling.

The second embodiment of the present invention will be explained with reference to FIG. 14.

An image input unit 10 may be a television camera for photographing a 3-D object. In the embodiment, the camera photographs a polyhedron object in two different directions, to provide two input images of the object. The images are displayed on a display unit 50.

With a wire-frame indication unit 63, which may be a pointing device such as a mouse, a user specifies end points and edges on the displayed images. The specified end points and edges are transferred to an wire-frame combiner 64. The combiner 64 stores the two-dimensional (2-D) input images provided by the image input unit 10 as well as the end points and edges provided by the wire-frame indication unit 63.

These data are transferred to a polygon divider 71. Namely, the combiner 64 prepares two-dimensional data involving end points P2, P3, P4, and so on and edges P1-P2, P1-P3, and so on as shown in FIG. 15 and sends them to the divider 71.

The divider 71 divides these data into polygons. For example, the divider 71 checks the end points in clockwise direction starting from the end point P1. As a result, the surface A, for example, is defined as P1-P3-P4-P2-P1. In this way, the input image is divided into polygonal surfaces A to E each forming a minimum loop.

A polygon recognition unit 72 three-dimensionally recognizes each of the two-dimensional polygonal surfaces. For this purpose, a known technique is employed. This technique photographs a flat polygon in different directions to provide two images of the polygon. In each of the images, at least four end points are specified. According to coordinates of the end points, 3-D coordinates of the end points are computed.

A polyhedron combiner 73 combines the recognized 3-D images together to provide a polyhedron shown in FIG. 15.

Instead of using intersections defined by the surfaces A, B, and C, intersections defined by the surfaces B, C, D, and E may be used to provide a combined polyhedron having less combination errors.

A texture adding unit 41 adds a texture of each part of the input image provided by the image input unit 10 to a corresponding surface of the polyhedron provided by the polyhedron combiner 73. The texture added data is stored in a recognition result holder 46.

The display unit 50 displays the polyhedron stored in the holder 46 at a required angle. Through a distance data unit 23, a user may enter data for defining an angle and a distance to display the polyhedron. According to these data, a display controller 51 processes the polyhedron data stored in the holder 46 and displays a 3-D image of the object on the display unit 50.

The display unit 50 also displays the input images provided by the image input 10, so that end points and edges may be specified on the displayed images through the wire-frame indication unit 63.

The polyhedron combiner 73 combines 3-D data of polygons and provides 3-D data of a polyhedron. This determines only the angular relationship between a view point and a plane of the polyhedron but not the distance between them. When the distance between the view point and a point on a plane of the polyhedron is determined, the distances between the view point and other points on the polyhedron are determined.

Accordingly, a distance between a specific end point and a view point is firstly determined and set in the distance data unit 23. According to this distance and recognition results of the surfaces of the polyhedron, the 3-D coordinates of all other end points of the polyhedron will be determined.

Figure 16:
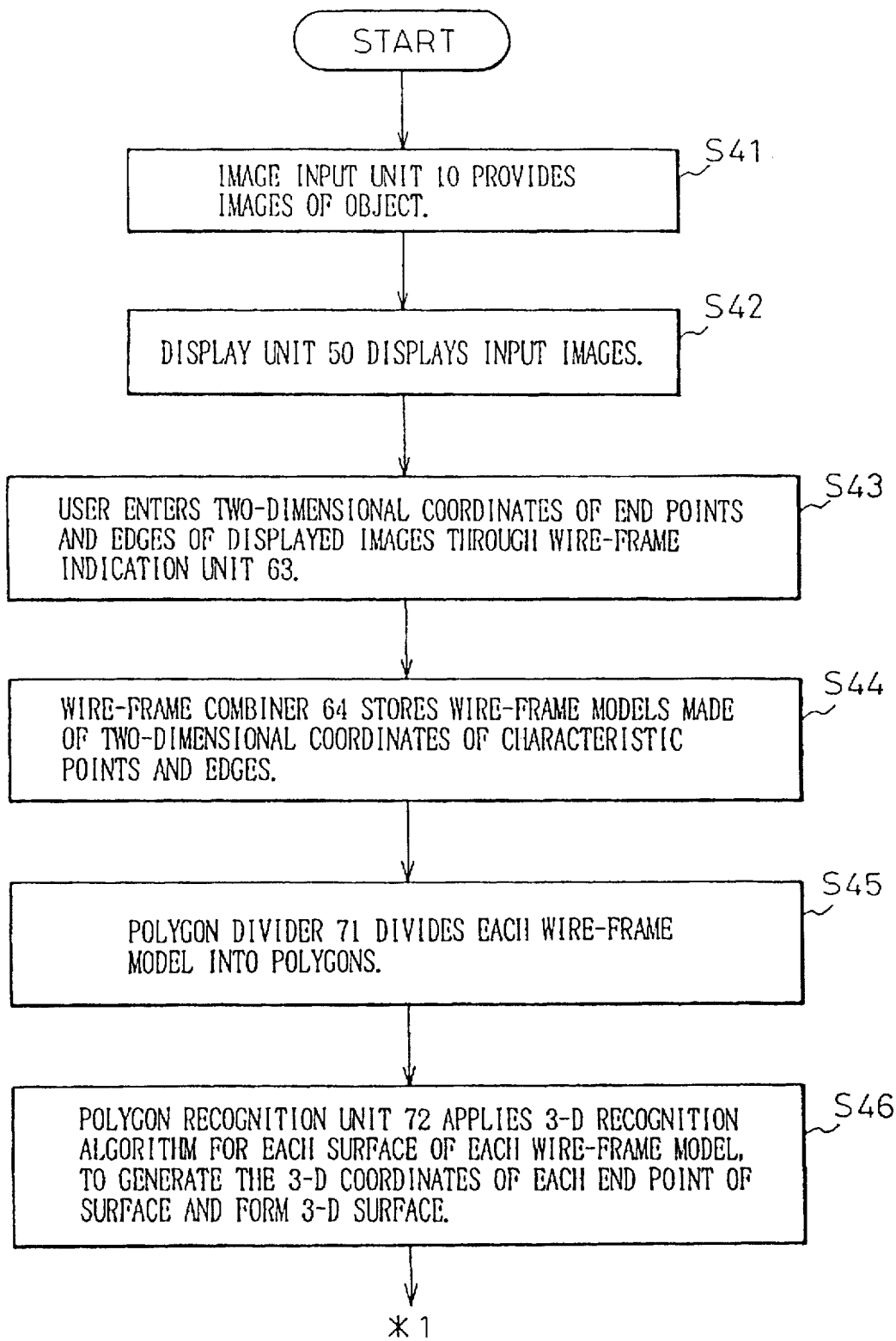
FIGS. 16 and 17 are flowcharts showing the operations of the second embodiment.
Figure 17:
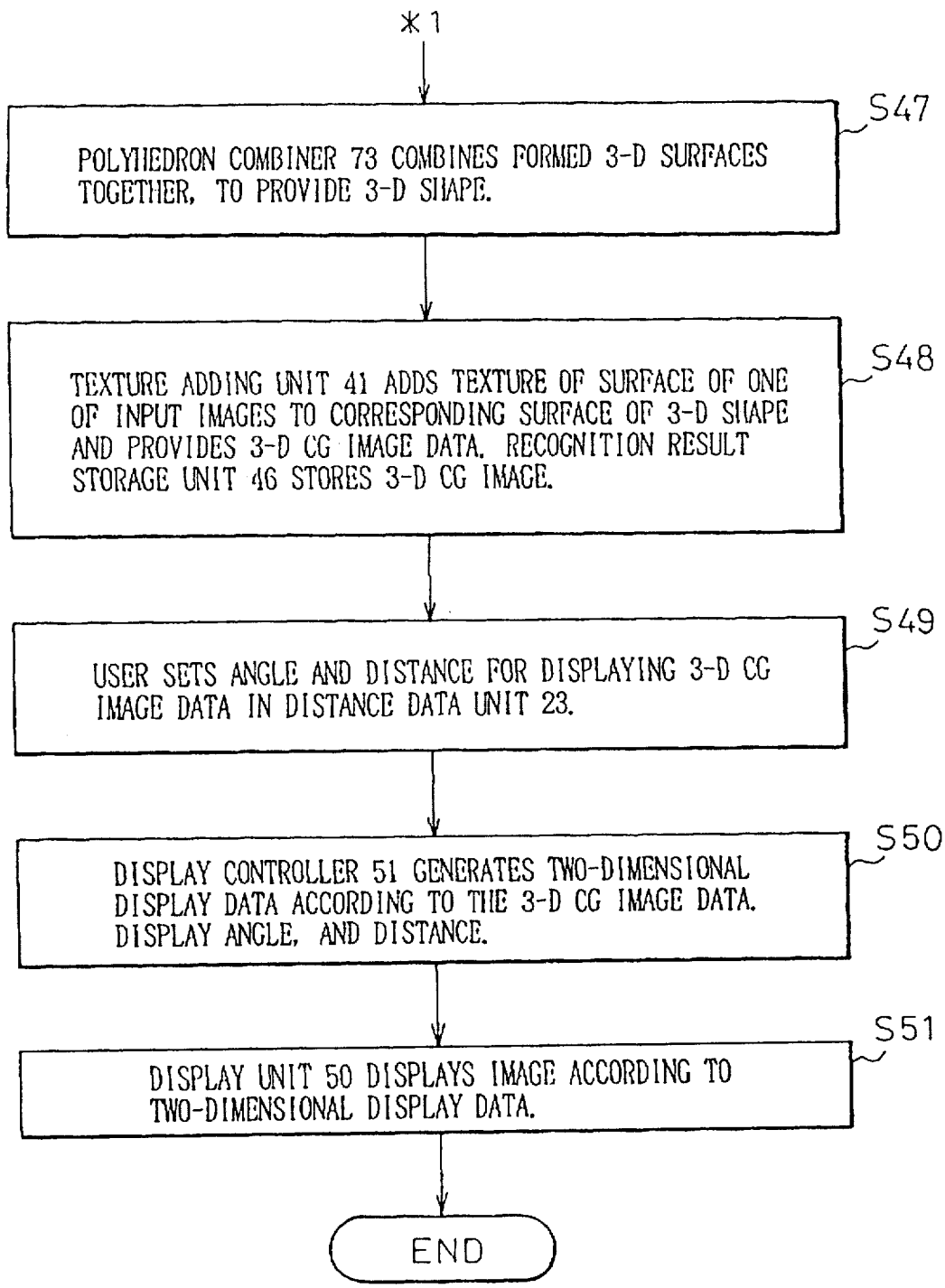

FIGS. 16 and 17 are flowcharts summarizing the operations of the second embodiment. Since these operations mentioned in steps S41 to S51 of the flowcharts have already been explained with reference to FIGS. 14 and 15, they will not be explained again.

C. Third Embodiment of the Invention

Figure 18:
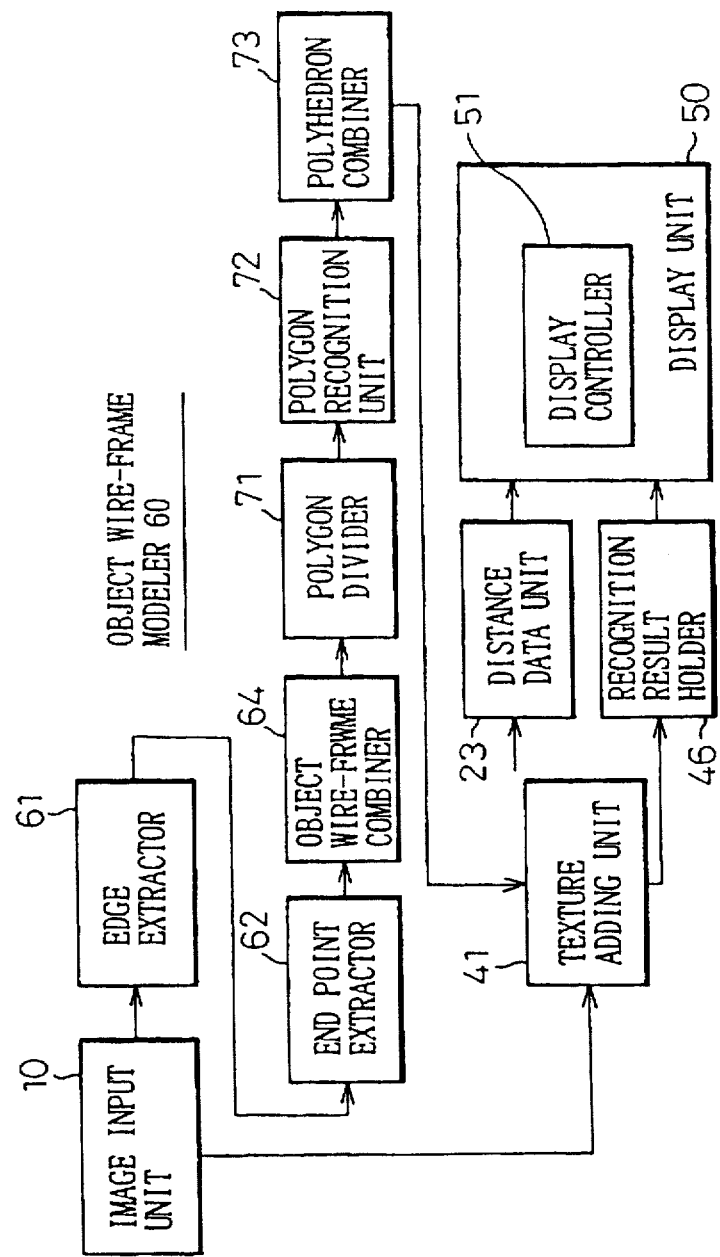
FIG. 18 shows a 3-D CG image generator according to a third embodiment of the present invention.

The third embodiment of the present invention will be explained with reference to FIG. 18.

An edge extractor 61 employs, for example, a differential filter for spatially filtering input images of a polyhedron object, to extract edges of the images according to density differences among surfaces of the polyhedron, or between the polyhedron and the background.

An end point extractor 62 extracts bending and branching points as end points from the edges.

An image input unit 10 photographs the polyhedron object in different directions and provides two images. The edge extractor 61 employing the differential filter carries out a differentiation and provides edge images. The end point extractor 62 extracts bending and branching points as end points from the edge images. Edges linking the end points are also detected. The end points and edges are used to provide wire-frame models.

A polygon divider 71 divides each of the wire-frame models into polygons. For example, branching points of each wire-frame model are tested to detect polygons each serving as a minimum loop. A polygon recognition unit 72 provides 3-D data of each of the two-dimensional polygons. A polyhedron combiner 73 combines the 3-D data of the polygons, to provide 3-D data of the polyhedron object.

A texture adding unit 41 adds a texture of a surface of each input image provided by the image input unit 10 to a corresponding surface of the polyhedron image. The texture added data are stored in a recognition result holder 46. A user enters a display angle and a distance through a distance data unit 23. According to the entered data, a display controller 51 processes the data stored in the holder 46 and displays a 3-D CG image based on the processed data on a display unit 50.

In this way, the polyhedron object is recognized as a 3-D image with no distortion.

Figure 19:
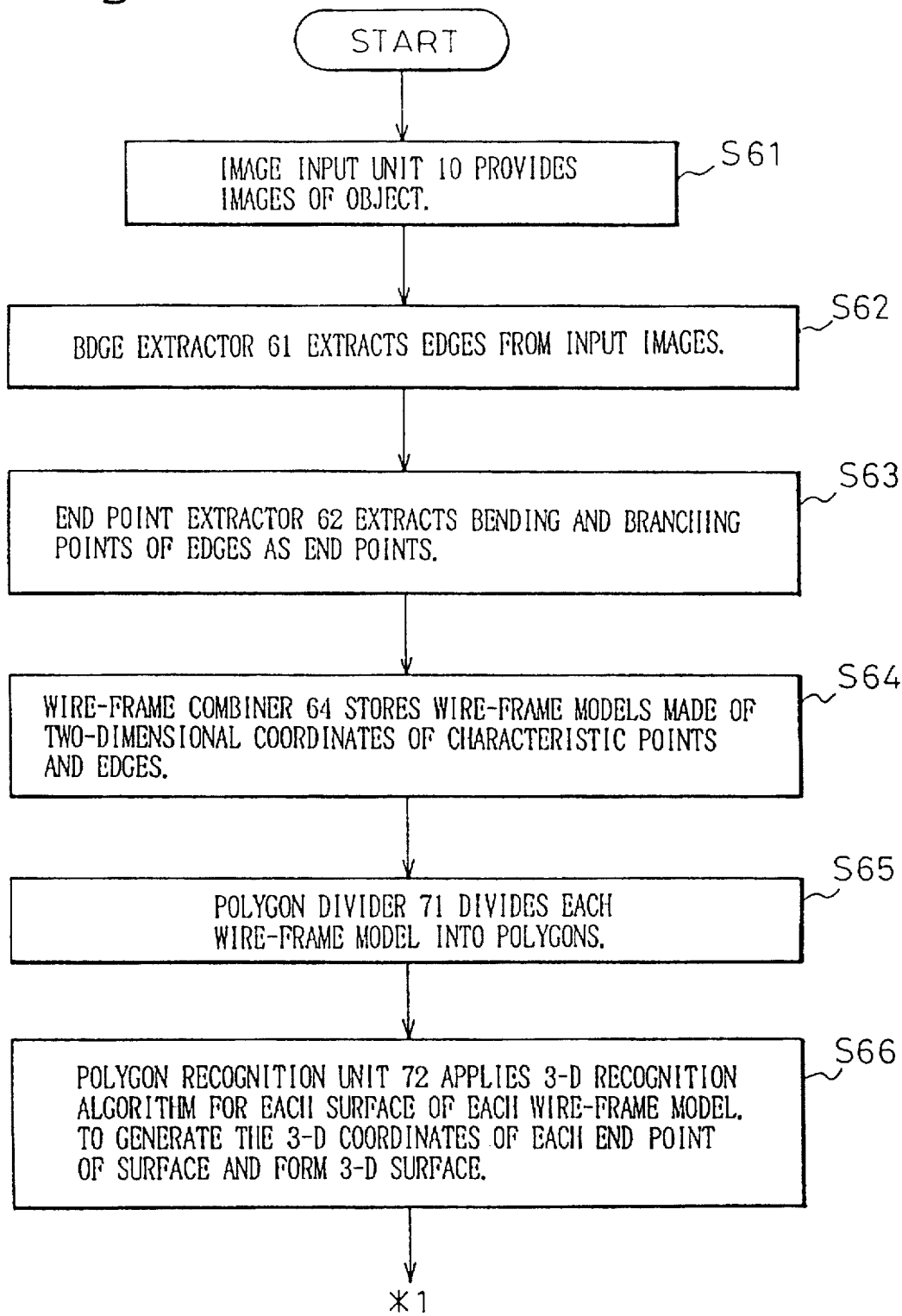
FIGS. 19 and 20 are flowcharts showing the operations of the third embodiment.
Figure 20:
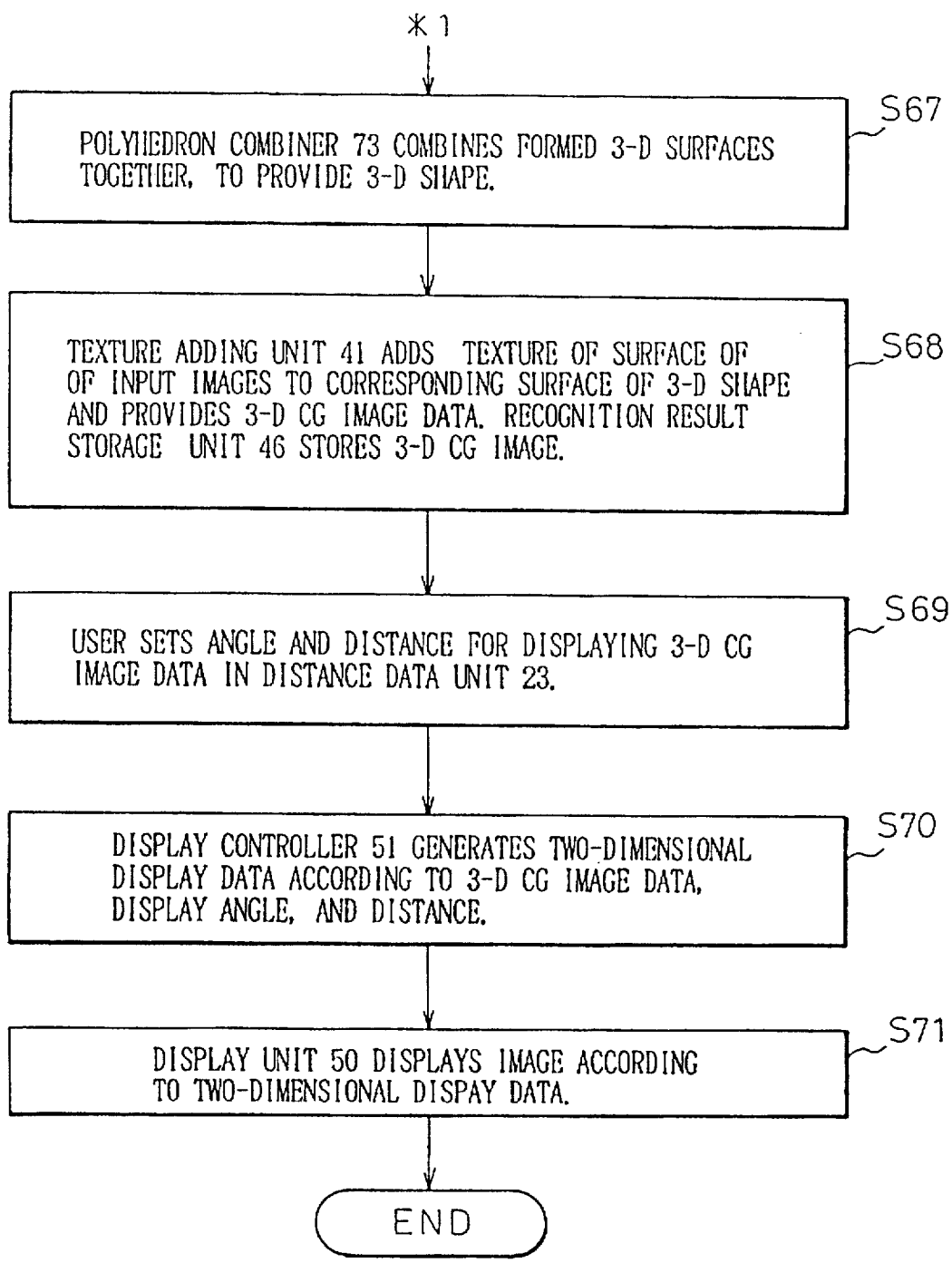

FIGS. 19 and 20 are flowcharts summarizing the operations of the third embodiment. These operations in steps S61 to S71 of the flowcharts have already been explained with reference to FIG. 18, so that they will not be explained repeatedly.

D. Fourth Embodiment of the Invention

Figure 21:
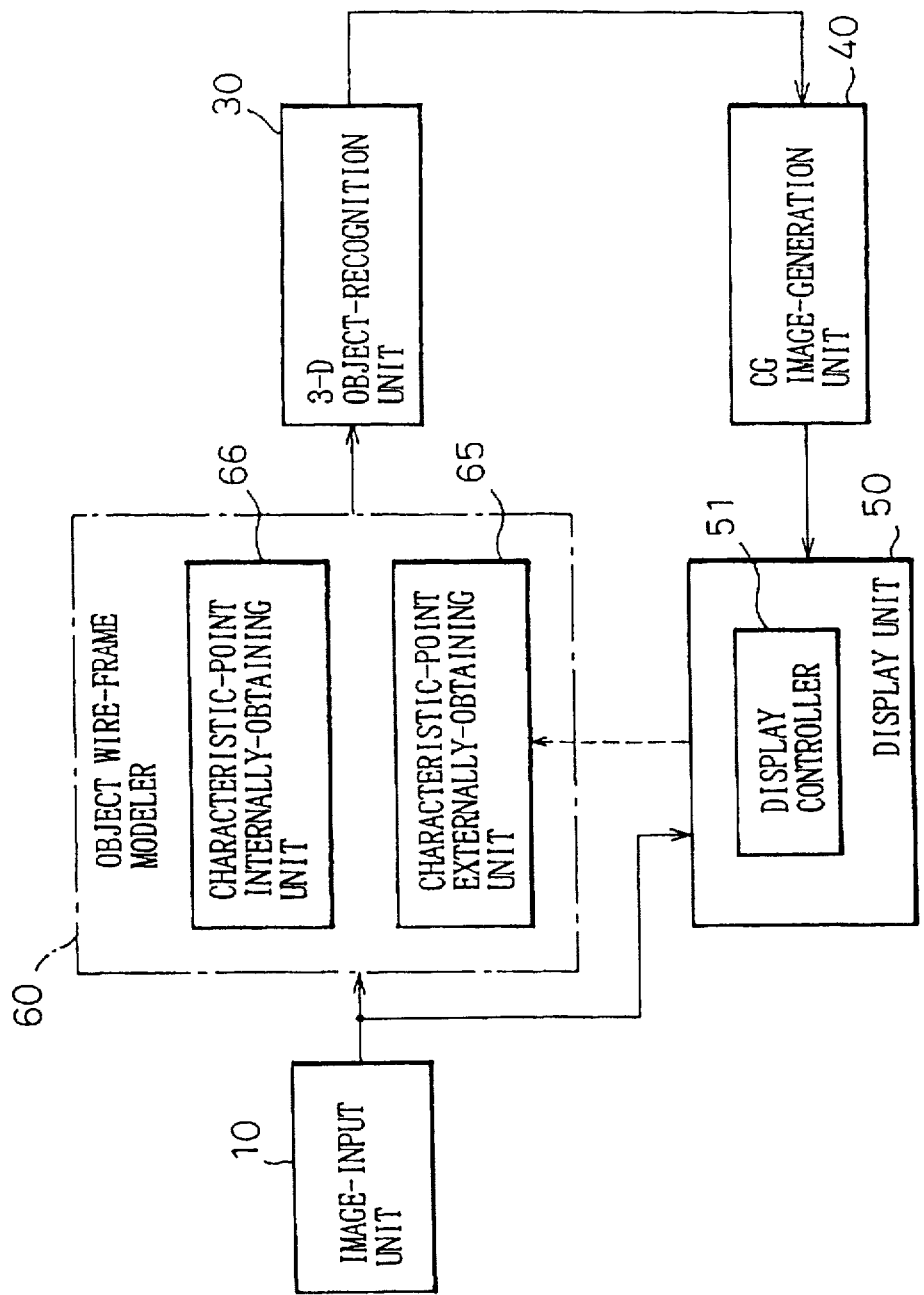
FIG. 21 shows a 3-D CG image generator according to a fourth embodiment of the present invention.

FIG. 21 shows a basic arrangement of a 3-D CG image generator according to the fourth embodiment of the present invention.

The CG image generator includes an image input unit 10 for photographing a 3-D object and providing input images of the object, a display unit 50 for displaying the input images, an object wire-frame modeler 60 for preparing wire-frame models formed of characteristic parts specified on the input images, a 3-D object recognition unit 30 for providing 3-D data according to the wire-frame models, and a CG image generation unit 40 for generating a CG image of the object according to the 3-D data provided by the recognition unit 30 and displaying the CG image on the display unit 50.

The wire-frame modeler 60 includes a characteristic part externally obtaining unit 65 for receiving and correcting characteristic parts according to external instructions, and a characteristic part internally obtaining unit 66 for receiving and correcting characteristic parts according to determinations made by the CG image generator itself.

The CG image generator of FIG. 4 and the object recognition unit of FIG. 13 may have the problem of distortion of images, as explained before. The fourth embodiment solves this problem in a way different from the previous embodiment.

Figure 22A:
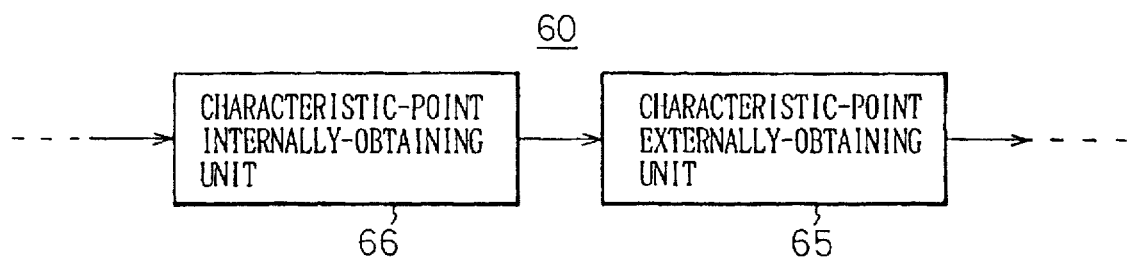
FIGS. 22A to 22C show examples of wire-frame modelers according to the fourth embodiment.
Figure 22B:
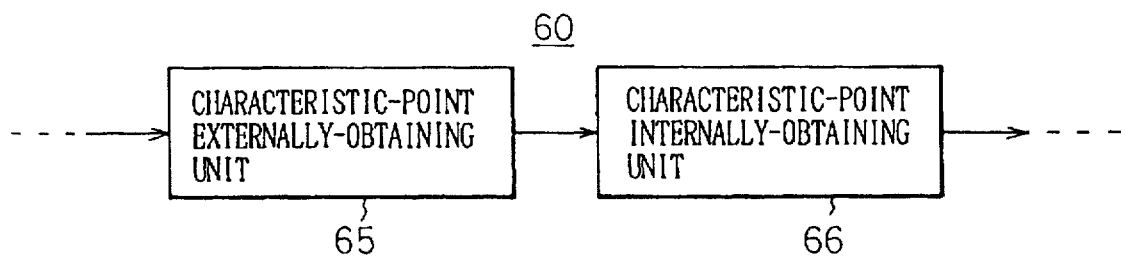
Figure 22C:
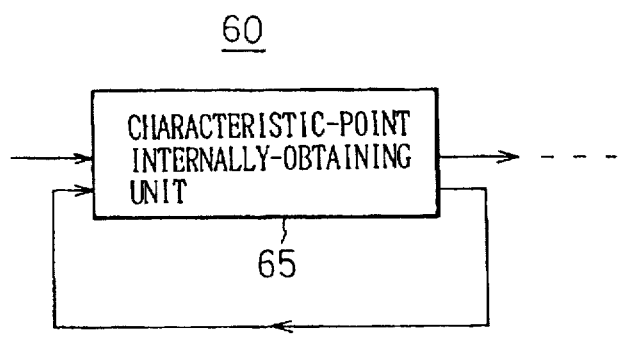

The wire-frame modeler 60 of the fourth embodiment of FIG. 21 may be realized in various ways. FIGS. 22A to 22C show three examples of the modeler 60.

In the wire-frame modeler 60 of FIG. 22A, the internal unit 66 extracts characteristic points, which are corrected by the external unit 65, to provide wire-frame models.

In the wire-frame modeler 60 of FIG. 22B, characteristic points are entered through the external unit 65, and the entered characteristic parts are corrected by the internal unit 66, to provide wire-frame models.

In the wire-frame modeler 60 of FIG. 22C, characteristic parts are entered through the external unit 65, and the entered characteristic parts are corrected by the external unit 65, to provide wire-frame models.

When input images are too complicated to process, the images may be quickly processed if a user enters characteristic parts thereof from the beginning, instead of correcting processed results. The second and third examples mentioned above are effective in such a case.

In these examples, input images are displayed on the display unit 50, and characteristic parts extracted by the internal unit 66 are superimposed on the input images. While monitoring the images, a user may enter characteristic parts through the external unit 65. In this case, the characteristic parts obtained through the internal unit 66 are simply displayed on the display unit 50.

The characteristic parts are end points and edges that define a 3-D object, as explained above.

According to the wire-frame modeler 60 of the second example, a user enters characteristic parts through the external unit 65 (for example, a pointing device such as a mouse). The entered characteristic parts are corrected by the internal unit 66. The characteristic parts entered through the mouse by the user may involve errors due to manual operation, so that the internal unit 66 removes these errors.

When a first characteristic part is entered through the external unit 65, the internal unit 66 may extract a second characteristic part around the first characteristic part. According to the second characteristic part, the first characteristic part is corrected.

Figure 23A:
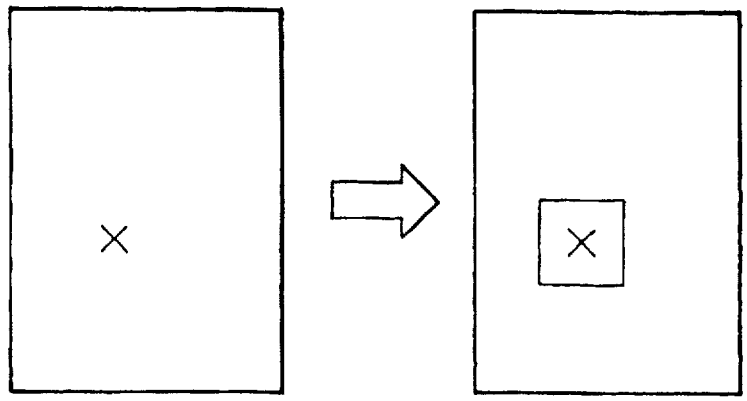
FIGS. 23A and 23B explain the arrangement of FIG. 22B.

In practice, the second characteristic part may be a density distribution around the first characteristic part, as shown in FIG. 23. For example, a user operates the external unit 65 to enter a characteristic point X on each of two input images "1" and "2" shown in FIG. 23A (refer to FIGS. 2A and 2B).

Figure 23B:
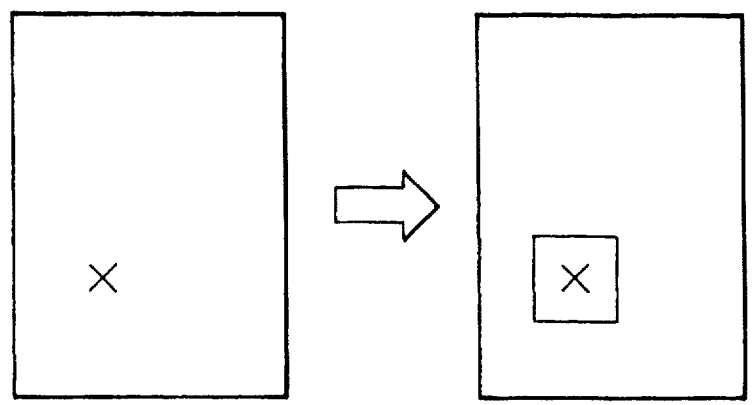

On the other hand, the internal unit 66 collates density distributions in small regions (each surrounded by a square frame) around the X marks with each other, as shown in FIG. 23B. Namely, in one of the input images, for example in the image "2," the mark X is slightly moved, and at each position, the density distribution of the mark X in the input image "2" is compared with that of the mark X in the image "1." When they agree with each other, the position of the mark X is determined to be an optimum characteristic point. Namely, when the sum of absolute density values of a pair of corresponding pixels in the input images "1" and "2" becomes minimum, the position of the mark X is determined as a characteristic point.

When one specifies characteristic points with a mouse, the characteristic points may involve errors due to the manual operation. The internal unit 66 corrects such errors.

Another technique of correcting such errors enlarges the magnification of images displayed on the display unit 50 when entering characteristic parts through the external unit 65. For example, when specifying characteristic points on the input image "1" in FIG. 2A, the display window for the input image "1" is expanded to a full screen size. Then, a user may manually specify characteristic parts more accurately than before. The enlargement of images is carried out through the display controller 51 in a known manner.

In FIG. 21, the image input unit 10 photographs a 3-D object in different directions, to provide a plurality of input images. The recognition unit 30 three-dimensionally recognizes common characteristic points of the input images and provides 3-D data of the respective input images. These data are combined together to provide 3-D data for the whole part of the object.

When three input images "1" to "3" are provided as shown in FIGS. 2A to 2C, characteristic points shared by the input images "1" and "2" are three-dimensionally recognized. Namely, each visible part of each of the two images is able to provide 3-D data. In other words, a characteristic point that is visible only in one of the input images "1" and "2" is unable to provide 3-D data.

For example, if there is a characteristic point that is visible on the input image "1," invisible on the input image "2," and visible on the input image "3," 3-D information about the characteristic point in question is obtained from each of the input images "3" and "1," and the two pieces of the 3-D information are combined together. In this way, the 3-D data for the whole of the object are obtained as much as possible.

Figure 14:
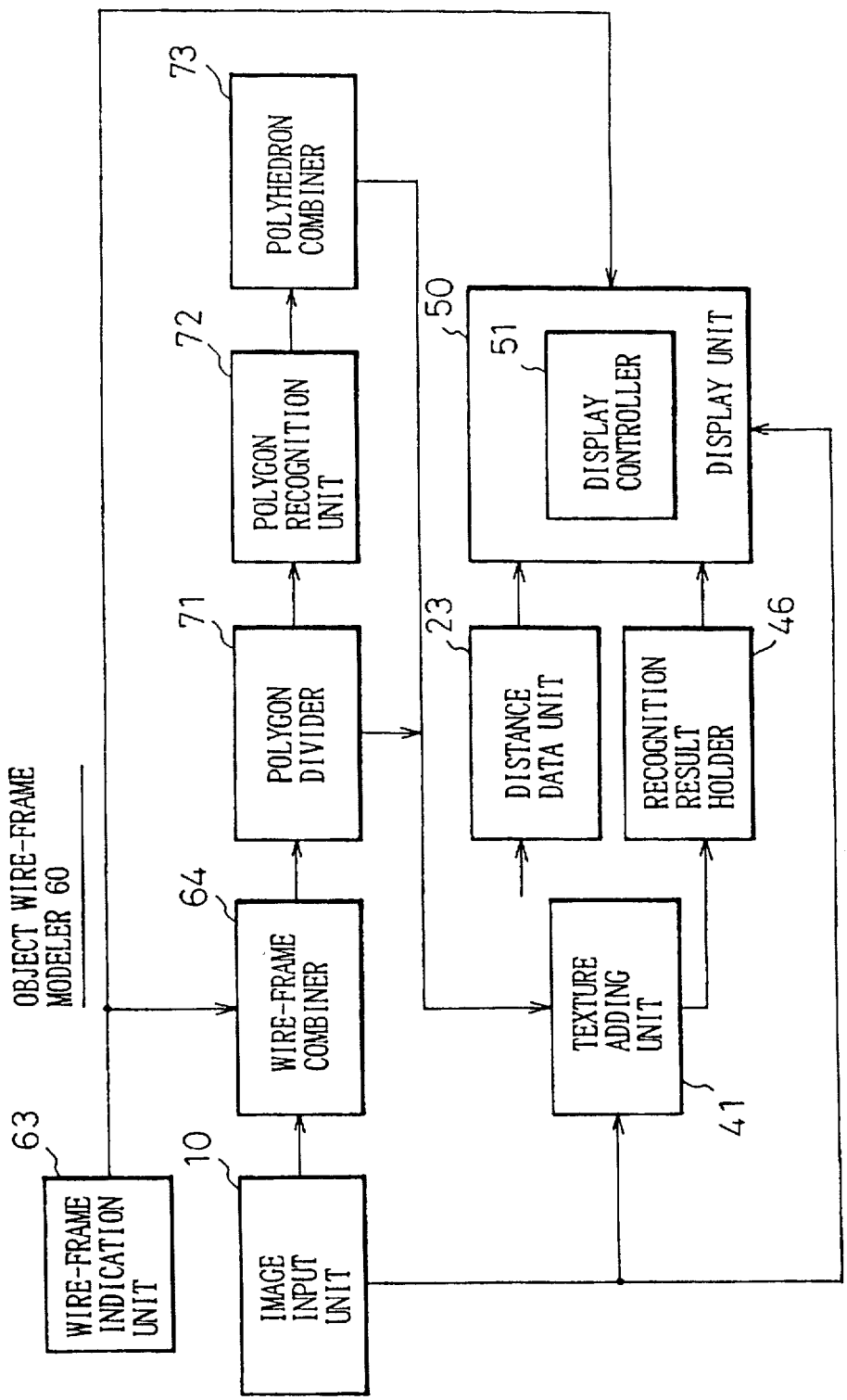
FIG. 14 shows a 3-D CG image generator according to a second embodiment of the present invention.

The CG image generation unit 40 of FIG. 21 includes the texture adding unit 41 shown in FIG. 14. The function achieved by the texture adding unit 41 may take various forms. Three examples of the texture adding function will be explained.

(1) The recognition unit 30 provides a 3-D shape of an object. Each surface of the 3-D shape is provided with a texture of a corresponding surface of an input image that has been photographed at an angle that is closest to a display angle of the 3-D shape on the display unit 50.

For example, when the image "4" of FIG. 2D is to be displayed on the display unit 50, textures of corresponding surfaces of the input image "2" will be selected.

(2) The recognition unit 30 provides a 3-D shape of an object. Each surface of the 3-D shape is provided with a texture of a corresponding surface of an input image that has been photographed in a direction where the surface in question is most clearly visible.

For example, when allotting a texture to a surface of the 3-D shape that corresponds to a trianglular surface 1-3-4 shown in FIGS. 2A to 2D, the input image "1" will be selected because the surface 1-3-4 thereof is most clearly visible among the input images "1" to "4."

(3) The recognition unit 30 provides a 3-D shape of an object. Each surface of the 3-D shape is provided with a texture that is obtained by interpolating textures of corresponding surfaces of input images that have been photographed at different angles around the display angle of the 3-D shape on the display unit 50.

For example, if a given surface of the display image "4" of FIG. 2D is located between a corresponding surface of the input image "1" of FIG. 2A and a corresponding surface of the input image "2" of FIG. 2B, textures of the corresponding surfaces of the input images "1" and "2" are interpolated to provide a texture for the given surface of the image "4." Namely, a density at a common point is obtained from each of the input images "1" and "2." These two densities are interpolated, to provide an interpolated density. The interpolation is carried out for each of R, G, and B elements in the case of a color image.

The fourth embodiment will be explained in detail.

Figure 24:
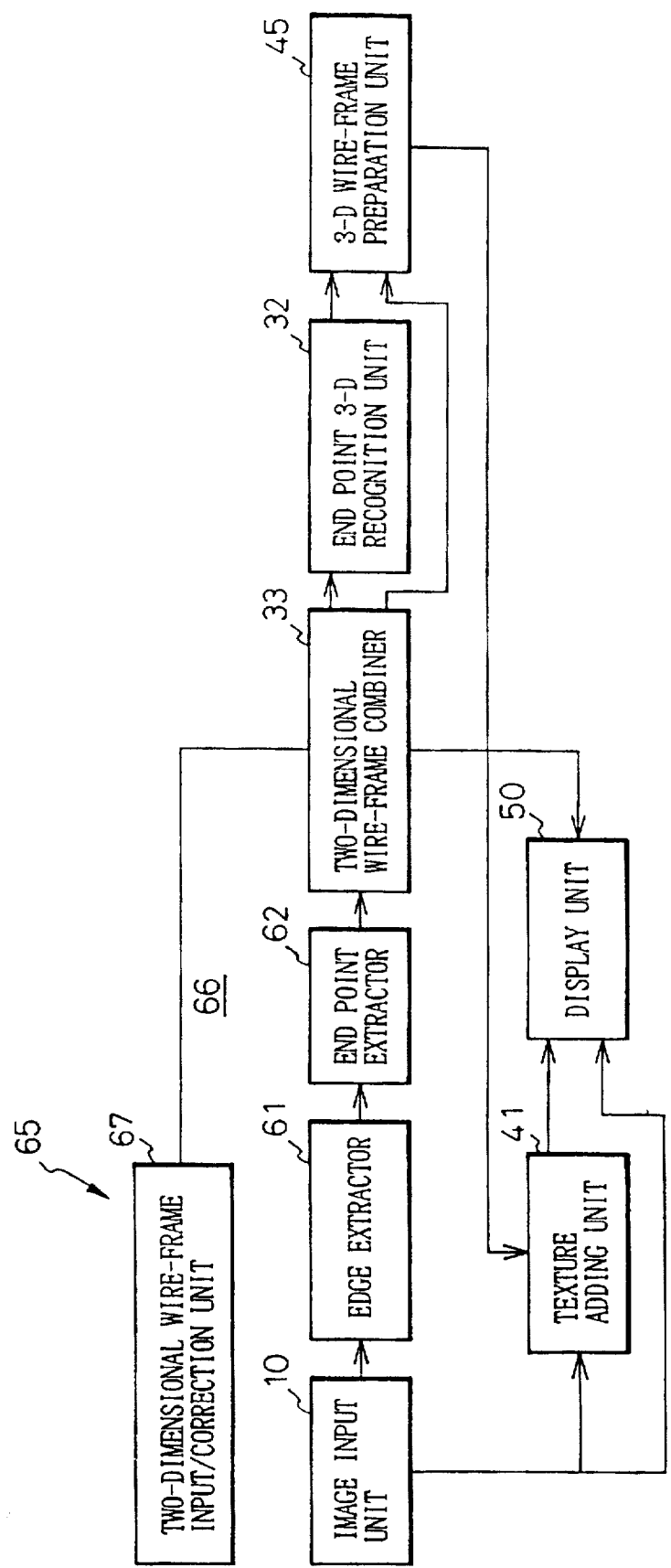
FIG. 24 shows an arrangement based on the fourth embodiment.

FIG. 24 shows a first example of the fourth embodiment. This example corresponds to the arrangement of FIG. 22A.

A characteristic point internally obtaining unit 66 includes an edge detector 61 and an end point extractor 62. A characteristic point externally obtaining unit 65 serves as a two-dimensional wire-frame input/correction unit 67, which is, for example, a pointing device such as a mouse. An output of the unit 67 and an output of the extractor 62 are supplied to a two-dimensional wire-frame combiner 33. The combiner 33 is a part of a 3-D object recognition unit 30. Other components of FIG. 24 are the same as those explained already.

The operations of the example of FIG. 24 are shown in FIGS. 25A to 25D.

Figure 25B:
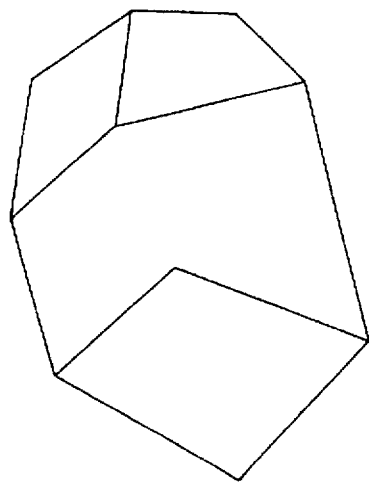
FIGS. 25A to 25D show examples of images in the arrangement of FIG. 24.
Figure 25D:
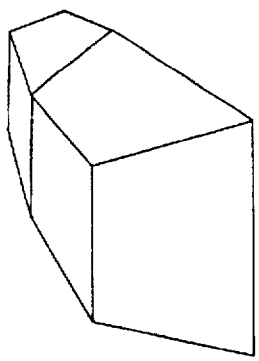
Figure 25A:
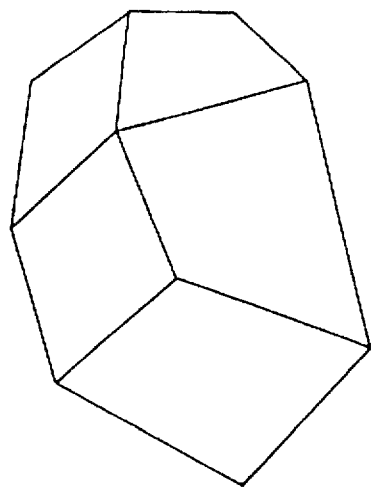

FIG. 25A shows an example of an input image provided by an image input unit 10. The input image is supplied to the internal unit 66, formed of the units 61 and 62, to extract characteristic points of the image.

FIG. 25B shows the extracted characteristic points. More specifically, FIG. 25B illustrates data provided by the end point extractor 62. In this figure, an edge is missed. Since the density of the input image changes delicately, it is very difficult to completely extract characteristic points out of the input image.

Figure 25C:
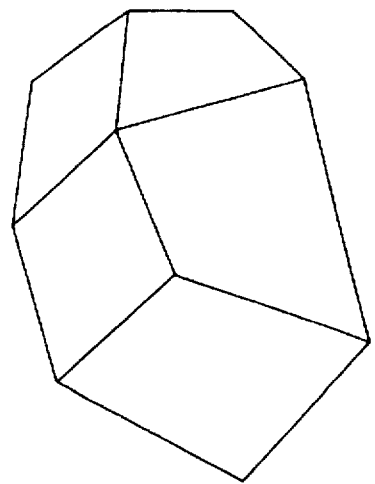

A user monitors the image of FIG. 25B on a display unit 50, and corrects the same through the external unit 65 (67), to add the missed edge. FIG. 25C shows a corrected result. More specifically, FIG. 25C shows data provided by the two-dimensional wire-frame combiner 33.

FIG. 25D shows a CG image with the corrected edge, viewed at a required display angle. More specifically, FIG. 25D shows an image displayed on the display unit 50.

Figure 26:
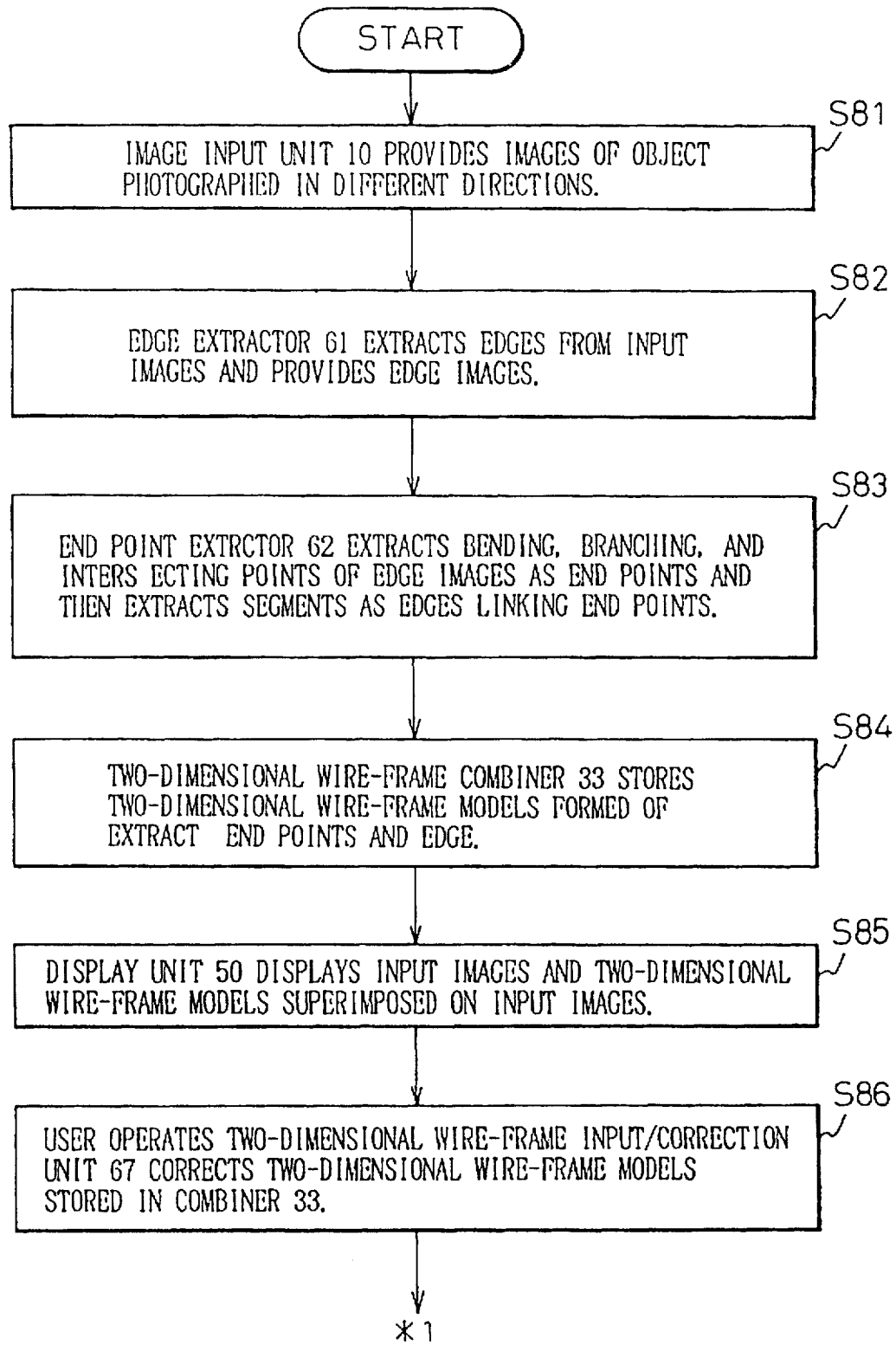
FIGS. 26 and 27 are flowcharts showing the operations of the arrangement of FIG. 24.
Figure 27:
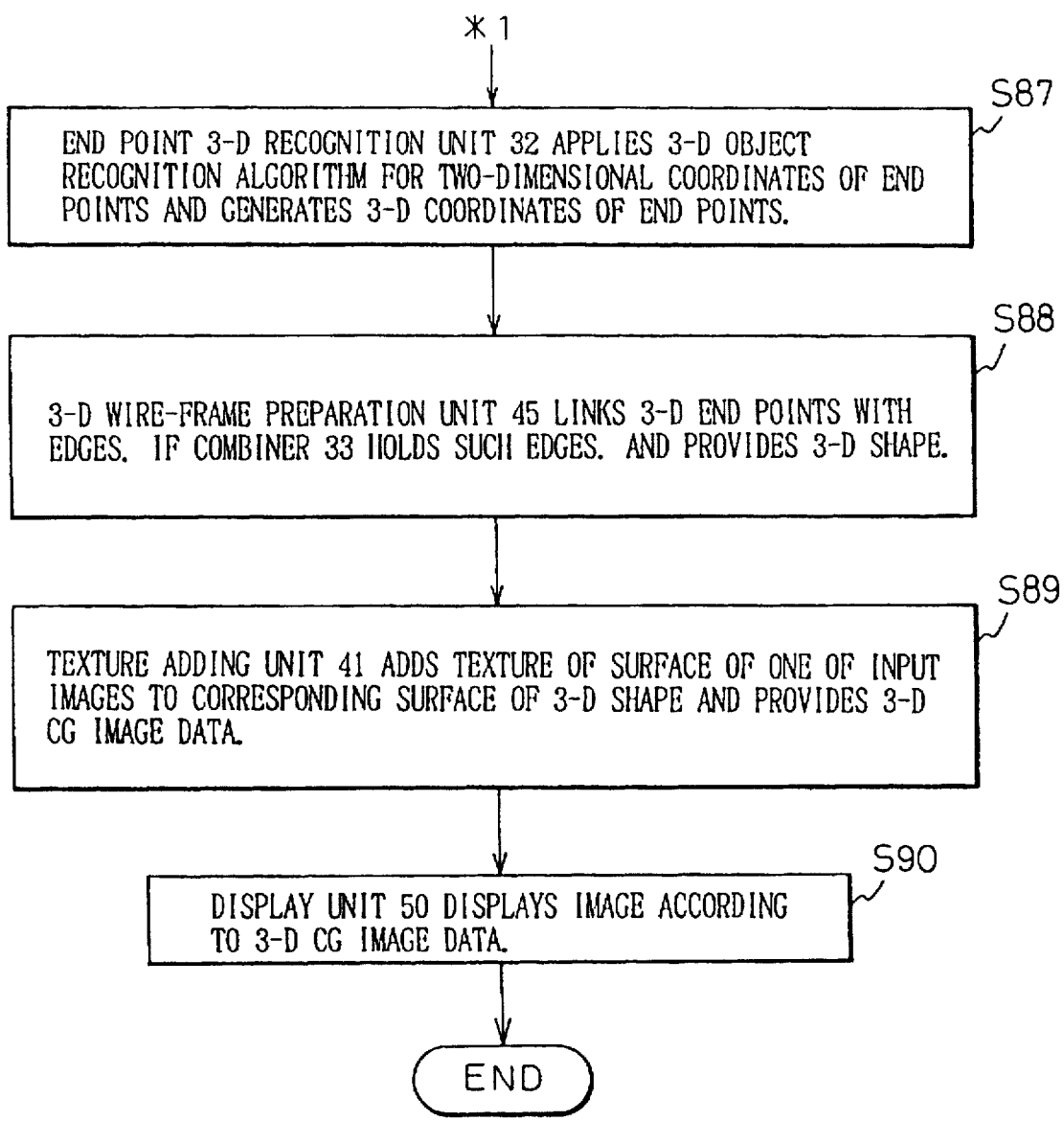

FIGS. 26 and 27 are flowcharts summarizing the operations of the example of FIG. 24. These operations mentioned in steps S81 to S90 have already been explained, so they will not be explained again.

Figure 28:
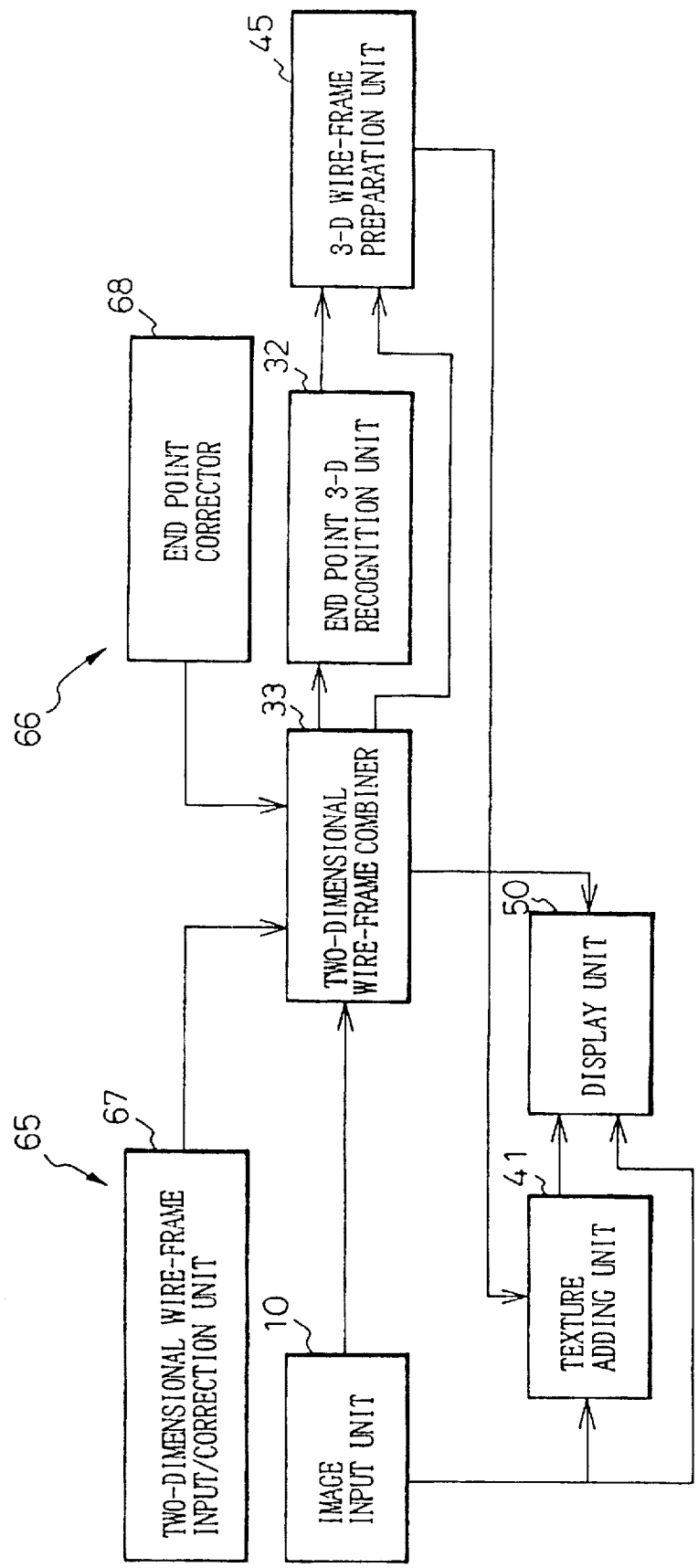
FIG. 28 shows a second arrangement based on the fourth embodiment.

FIG. 28 shows a second example of the fourth embodiment. This example corresponds to the arrangement of FIG. 22B.

A characteristic part internally obtaining unit 66 serves as an end-point corrector 68. Other parts of this example are the same as those of the example of FIG. 24.

Characteristic parts provided by a two-dimensional wire-frame input/correction unit 67 are corrected by the end point corrector 68. The end point corrector 68 may have a function of collating density distributions.

Figure 29:
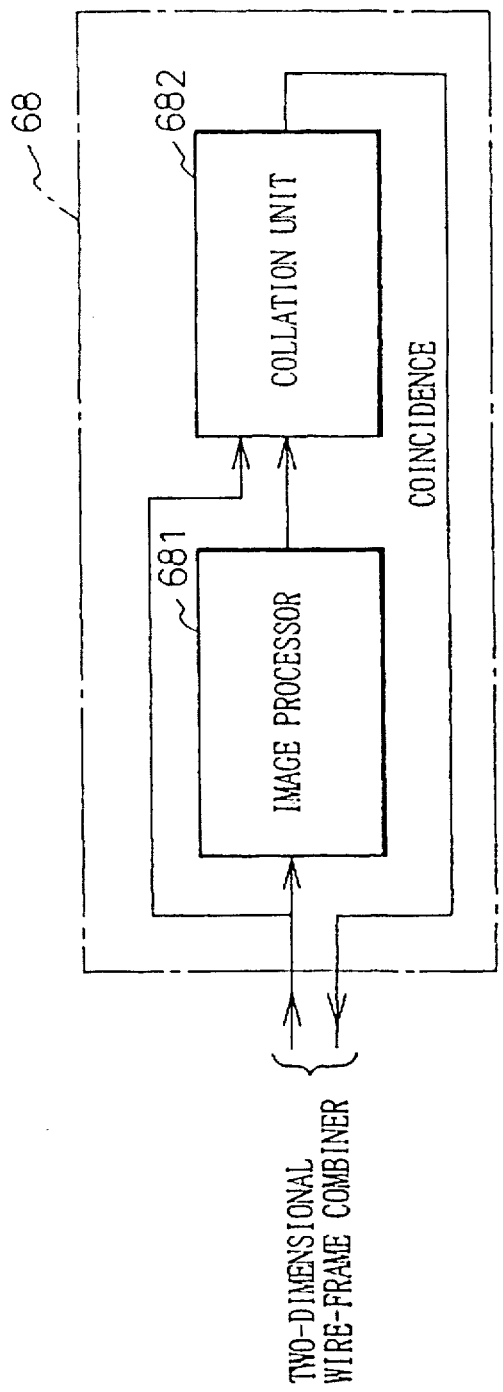
FIG. 29 shows an example of an end point corrector 68.

FIG. 29 shows an example of the end point corrector 68. An image processor 681 detects the density of each pixel in a square frame of an input image "1," as shown in FIG. 23B, and holds the density data. The density of each pixel in a square frame of an input image "2" is sequentially sent to a collation unit 682, which collates the density data of the input images "1" and "2" with each other. When they agree with each other, agreement information is sent to a two-dimensional wire-frame combiner 33, to determine a characteristic part.

Figure 30:
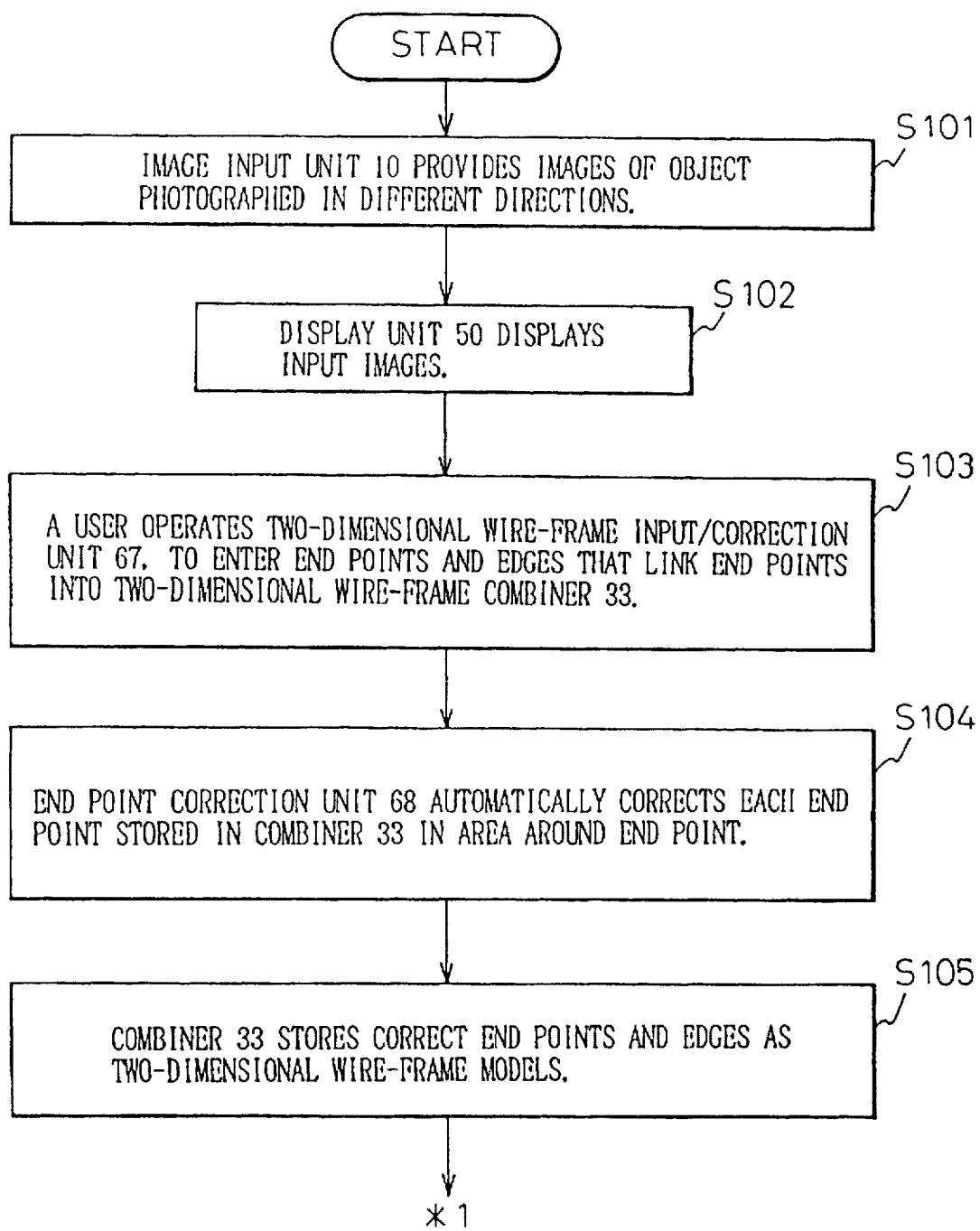
FIGS. 30 and 31 are flowcharts showing the operations of the arrangement of FIG. 28.
Figure 31:
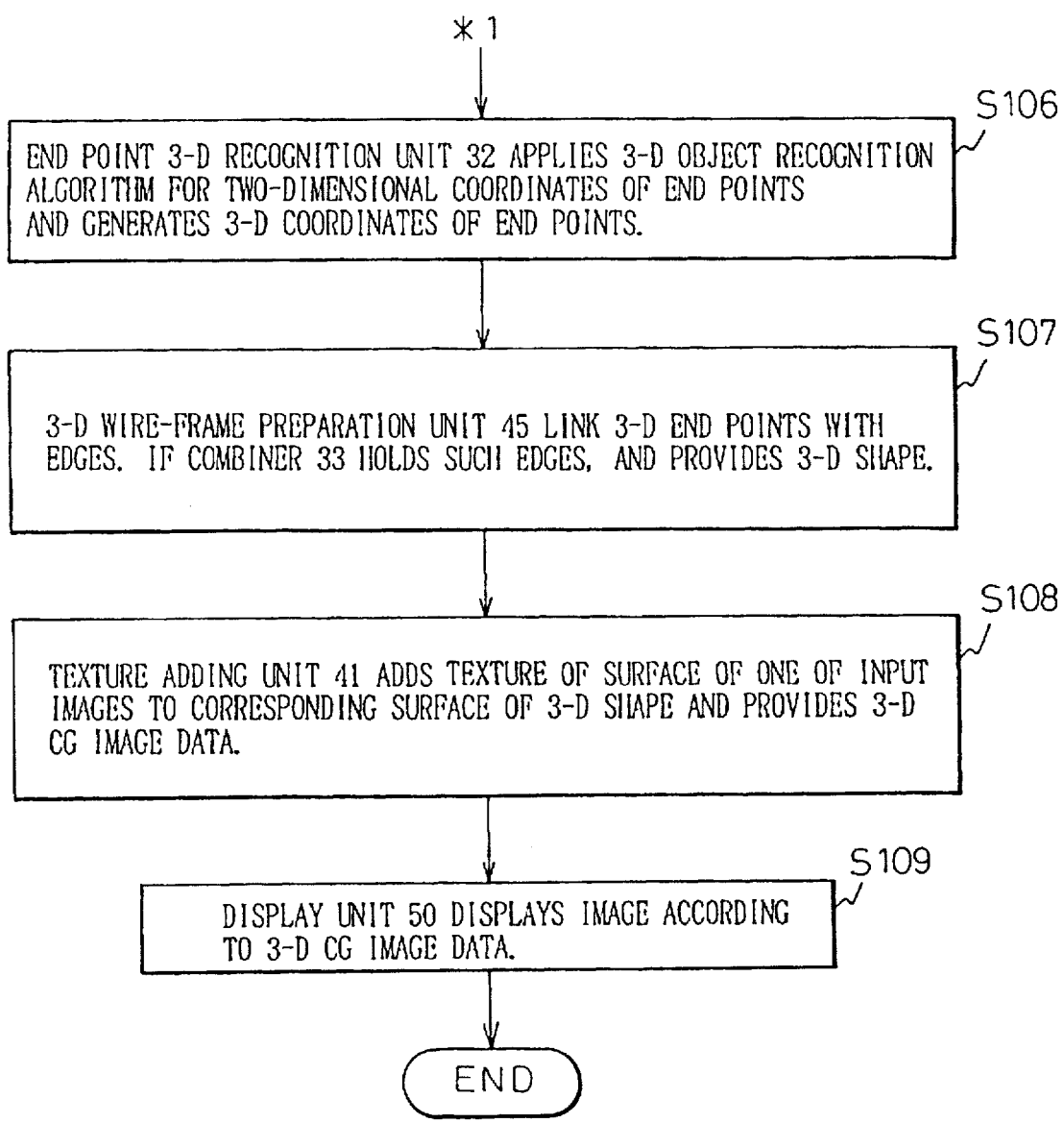

FIGS. 30 and 31 are flowcharts summarizing the operations of the example of FIG. 28. These operations mentioned in steps S101 to S109 have already been explained, so they will not be explained again.

Figure 32:
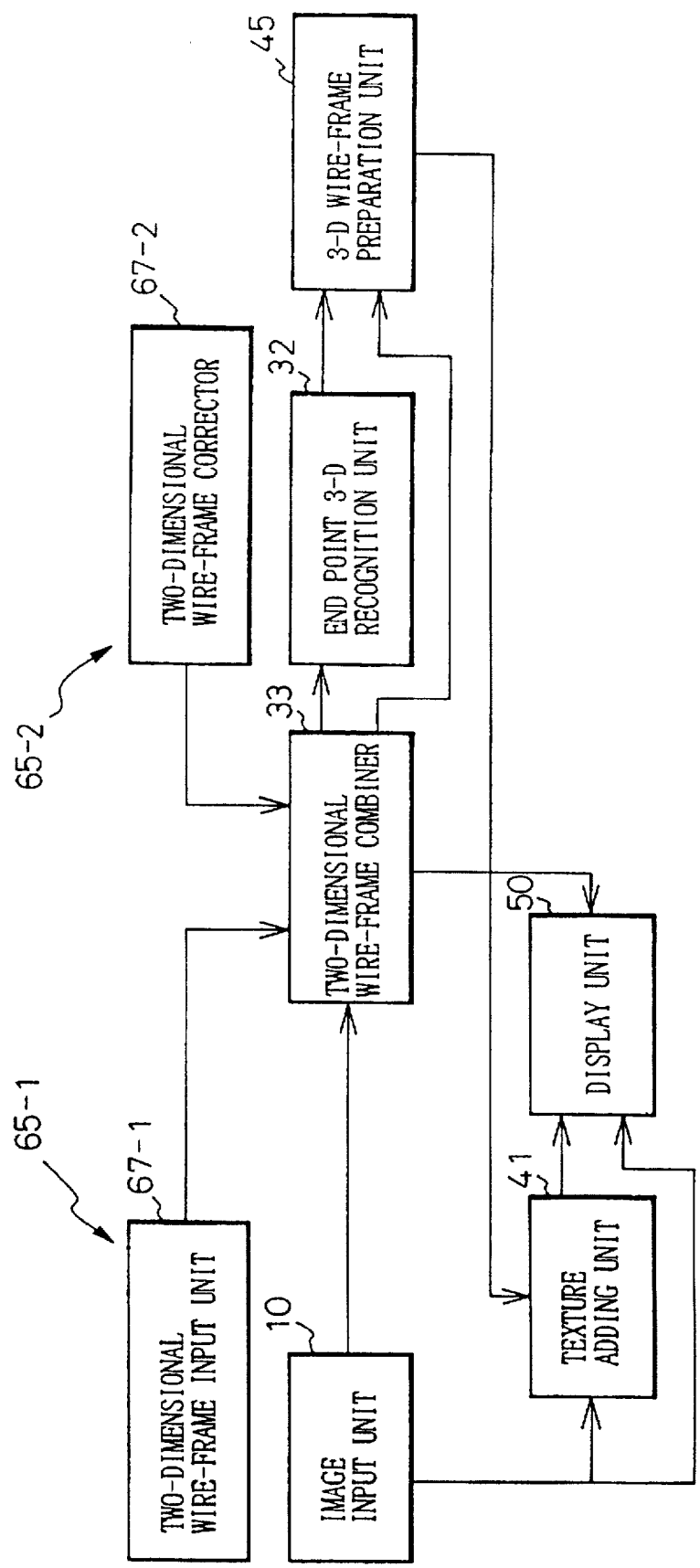
FIG. 32 shows a third arrangement based on the fourth embodiment.

FIG. 32 shows a third example of the fourth embodiment. This example corresponds to the arrangement of FIG. 22C.

A characteristic part externally obtaining unit 65 is formed of two parts 65-1 and 65-2. The part 65-1 serves as a two-dimensional wire-frame input unit 67-1 for entering characteristic points. The part 65-2 serves as a two-dimensional wire-frame corrector 67-2 for correcting the input characteristic parts.

Figure 33:
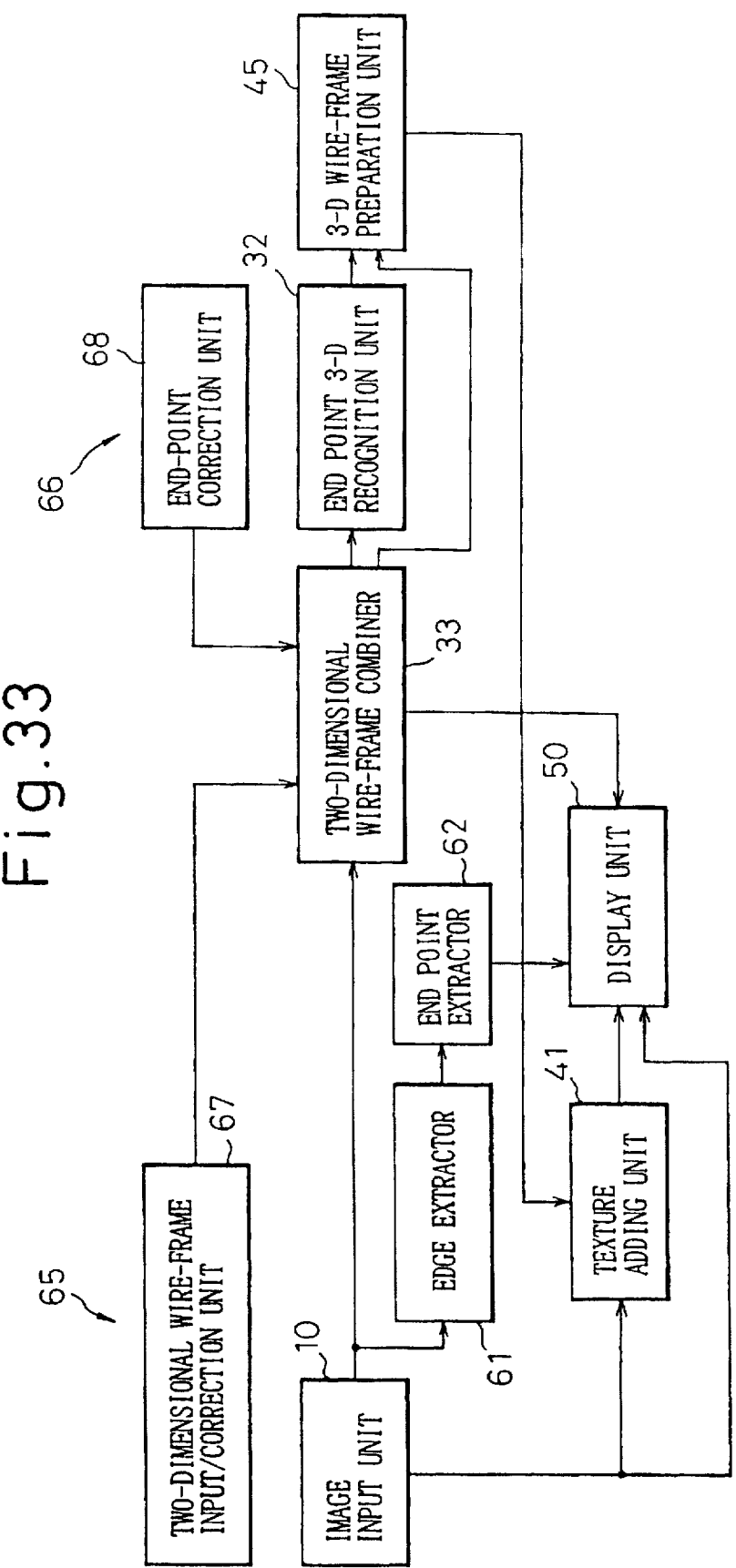
FIG. 33 shows a modification related to the arrangements of FIGS. 28 and 32.

In the arrangements of FIGS. 28 and 32, it will be effective if characteristic points extracted by the internal unit 66 are superimposed on input images displayed on the display unit 50, and according to the superimposed images, characteristic points are entered through the external unit 65. FIG. 33 shows such an arrangement. This arrangement is based on the arrangement of FIG. 28. Instead of the arrangement of FIG. 28, the arrangement of FIG. 32 is employable for realizing the arrangement of FIG. 33.

The 3-D object recognition method disclosed in JPP 3-300591 and referred to in this specification will be explained with reference to FIG. 34.

An image input unit 81 provides images of an object that is moving and rotating. A characteristic point extractor 82 extracts characteristic points out of the input images. A characteristic point storage unit 83 stores the extracted characteristic points. A shape/movement recognition unit 84 recognizes movements of the object according to the known positions of the characteristic points. Namely, the recognition unit 84 refers to orthogonal projection images of the object and known positions of four characteristic points of the object at three optional time points, and determines that the four characteristic points are not on the same plane, that an axis of rotation of the object is not in parallel with the direction of the orthogonal projection between optional two of the three time points, and that the rotation of the object between the optional two time points is not a 180-degree turn around an axis that is in parallel with the plane of the orthogonal projection. The unit 84 then computes the actual positions and movements of the four characteristic points.

This method is based on a theory that the shape (the positions of characteristic points) and movements of an object are obtainable even with one image input unit, if the characteristic points of the object are extracted at different time points.

As explained above, the present invention photographs an actual 3-D object to provide a user with images of the object, lets the user specify characteristic points on the images, forms characterized images, applies an image recognition technique on the characterized images, to obtain 3-D data of the object, and prepares a 3-D CG image of the object according to the 3-D data. Unlike the prior art that asks a user to enter all 3-D information of an object, the present invention easily prepares a realistic 3-D CG image of an object.

The second or third embodiment of the present invention three-dimensionally recognizes each surface of a polyhedron object and combines the recognized results together, so that (1) a flat original surface is recognized as flat to give no incongruousness, (2) natural textures are added to the surfaces of a recognized 3-D CG image, and (3) each surface of the object is recognized with four end points, and therefore, all kinds of polyhedrons are recognizable.

The fourth embodiment of the present invention compensatingly combines internally generated characteristic points of an object and externally specified characteristic points of the object together, to thereby improve the quality of a 3-D CG image to be prepared.

We claim:

1. A three-dimensional (3-D) computer graphics (CG) image generator for providing a CG image of a 3-D object, comprising:

image input means for inputting two-dimensional (2-D) images of the 3-D object into the CG image generator;
    display means for displaying the input images;
    characteristic point indication means for externally specifying characteristic parts on the displayed images, characteristic parts being end points and edges extending between the end points for defining the 3-D object; and 3-D object recognition means for providing 3-D data according to the characteristic parts specified on the displayed images, the 3-D data being used to prepare a CG image of the 3-D object.

2. The CG image generator according to claim 1, wherein the indication means is a pointing device.

3. The CG image generator according to claim 1, wherein the characteristic parts specified by the characteristic point indication means are superimposed on the displayed images and displayed on the display means.

4. The CG image generator according to claim 1, wherein the 3-D object is photographed at different angles to provide a plurality of input images that are displayed on the display means, and on each of the input images, corresponding characteristic parts are specified by the characteristic point indication means.

5. The CG image generator according to claim 4, wherein:

the characteristic point indication means is a pointing device having a button, the pointing device pointing to coordinates on a coordinate system to specify characteristic parts, when the button of the pointing device is pushed down, a point on a coordinate system pointed at this moment by the pointing device is registered as a first characteristic point of the 3-D object, and when the button is released after being dragged, a point on the coordinate system pointed at this moment by the pointing device is registered as a second characteristic point of the 3-D object, and a segment links the first and second characteristic points and is registered as a characteristic line of the 3-D object.

6. The CG image generator according to claim 5, wherein the segment is continuously displayed on the display means as the pointing device is dragged until the button is released, to form an edge of the 3-D object.

7. The CG image generator according to claim 5, wherein:

a point where the button of the pointing device is pushed down is registered as a start point of a characteristic line when the distance between the point and a previously registered characteristic point is greater then a predetermined value.

a point where the button of the pointing device is released is registered as an end point of a characteristic line when the distance between the point and a previously registered characteristic point is greater than a predetermined value.

8. The CG image generator according to claim 5, wherein:

a registered characteristic point is registered as a start point of a characteristic line when a distance between the registered characteristic point and the point where the button of the pointing device is pushed down is smaller than a predetermined value, and a registered characteristic point is registered as an end point of a characteristic line when a distance between the registered characteristic point and the point where the button of the pointing device is released is smaller than a predetermined value.

9. The CG image generator according to claim 5, wherein a characteristic line is not registered and the start point and the end point of the characteristic line are not registered when the distance between the start point and the end point is smaller than a predetermined value.

10. The CG image generator according to claim 5, wherein a characteristic line is registered and the start point and the end point of the characteristic line are registered when the distance between the start point and the end point is greater than a predetermined value.

11. A three-dimensional (3-D) computer graphics (CG) image generator for providing a CG image of a 3-D object, comprising:

image input means for inputting two-dimensional (2-D) images of the 3-D object into the CG image generator;

wire-frame model means for preparing a 2-D wire-frame model from end points and edges specified on the input image;

polygon divider means for dividing the wire-frame model into polygons;

polygon recognition means for computing the 3-D coordinates of each of the polygons; and combining means for combining the 3-D coordinates of each of the polygons together, to provide 3-D data of a polyhedron that represents the 3-D object.

12. The CG image generator according to claim 11, wherein the wire-frame model means comprises:

wire-frame indication means for specifying the end points and edges on the input images; and combining means for combining the specified end points and edges with the input images.

13. The CG image generator according to claim 11, wherein the wire-frame model means comprises:

edge extraction means for extracting edges out of the input images; and end point extraction means for extracting end points out of the input images.

14. The CG image generator according to claim 11, wherein the polygon recognition means computes each of the polygons as a flat surface, to prepare a CG image of the polyhedron.

15. The CG image generator according to claim 14, wherein, when preparing a CG image of the polyhedron, a distance between a specific end point on the polyhedron and a view point is specified, and according to the specified distance and the computed polygons, the 3-D coordinates of other end points are determined.

16. A three-dimensional (3-D) computer graphics (CG) image generator for providing a CG image of a 3-D object, comprising:

image input means for inputting two-dimensional (2-D) images of the 3-D object into the CG image generator;

display means for displaying the input images;

wire-frame model means for preparing a 2-D wire-frame model with characteristic parts of the 3-D object obtained from the input images, characteristic parts being end points and edges extending between the end points for defining the 3-D object;

3-D object recognition means for providing 3-D data according to the wire-frame model; and CG image generation means for preparing a CG image of the 3-D object according to the 3-D data and for transmitting the CG image to the display means, wherein the wire-frame model means includes external means for entering or correcting the characteristic parts in response to externally provided instructions, and internal means for generating or correcting the characteristic parts without externally provided instructions.

17. The CG image generator according to claim 16, wherein the external means corrects the characteristic parts generated by the internal means and prepares the wire-frame model.

18. The CG image generator according to claim 16, wherein the internal means corrects the characteristic parts entered by the external means and prepares the wire-frame model.

19. The CG image generator according to claim 16, wherein the external means corrects the characteristic parts entered by the external means and prepares the wire-frame model.

20. The CG image generator according to claim 18, wherein the characteristic parts generated by the internal means are superimposed on the input images and displayed on the display means, and the external means enters the characteristic parts while referring to the characteristic parts generated by the internal means.

21. The CG image generator according to claim 18, wherein, when the external means enters a first characteristic part, the internal means generates a second characteristic part in the vicinity of the first characteristic part and corrects the first characteristic part according to the second characteristic part.

22. The CG image generator according to claim 21, wherein the second characteristic part is a point characterized by a density distribution around the first characteristic part.

23. The CG image generator according to claim 16, wherein the display means increases the magnification of the displayed input images when the characteristic parts are entered by the external means.

24. The CG image generator according to claim 16, wherein the input images correspond to the 3-D object being photographed from different direction, and the 3-D object recognition means recognizes characteristic parts common to the input images, to provide 3-D data for each of the input images, and combines the 3-D data of the input images together, to provide 3-D data for the entire 3-D object.

25. The CG image generator according to claim 16, wherein the CG image generation means includes a texture adding function for adding a texture to each surface of the image of the 3-D object provided by the 3-D object recognition means by selecting texture data of a corresponding surface of the input image whose photographed angle is closest to a display angle of the image of the 3-D object on the display means.

26. The CG image generator according to claim 16, wherein the CG image generation means includes a texture adding function for adding a texture to each surface of the 3-D object provided by the 3-D object recognition means by selecting a texture of a corresponding surface of the input image that shows the respective surface most clearly.

27. The CG image generator according to claim 16, wherein the CG image generation means includes a texture adding function for adding a texture to each surface of the image of the 3-D object provided by the 3-D object recognition means by interpolating texture data of corresponding surfaces of the input images, wherein the input images correspond to photographs of the 3-D object in different directions around a display angle of the surface in question.

28. The CG image generator according to claim 19, wherein the characteristic parts generated by the internal means are superimposed on the input images and displayed on the display means, and the external means enters the characteristic parts while referring to the characteristic parts generated by the internal means.

* * * * *